United States Patent
Nakano et al.

(10) Patent No.: US 11,427,159 B2
(45) Date of Patent: Aug. 30, 2022

(54) ANTENNA DRIVING APPARATUS AND ANTENNA DRIVING METHOD

(71) Applicant: DENSO CORPORATION, Kariya (JP)

(72) Inventors: Yuichiro Nakano, Kariya (JP); Yohei Nakakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 16/883,265

(22) Filed: May 26, 2020

(65) Prior Publication Data

US 2020/0282954 A1 Sep. 10, 2020

Related U.S. Application Data

(63) Continuation of application No. PCT/JP2018/043300, filed on Nov. 23, 2018.

(30) Foreign Application Priority Data

Dec. 13, 2017 (JP) .............................. JP2017-239099

(51) Int. Cl.
| | |
|---|---|
| *H01Q 23/00* | (2006.01) |
| *H01B 1/04* | (2006.01) |
| *H04W 4/02* | (2018.01) |
| *H04W 24/02* | (2009.01) |
| *H01Q 1/32* | (2006.01) |
| *B60R 25/24* | (2013.01) |
| *H04B 1/04* | (2006.01) |

(52) U.S. Cl.
CPC ........... *B60R 25/245* (2013.01); *H01Q 23/00* (2013.01); *H04B 1/04* (2013.01)

(58) Field of Classification Search
None
See application file for complete search history.

(56) References Cited

U.S. PATENT DOCUMENTS

| 7,933,325 B2 * | 4/2011 | Inaba ................ G07C 9/00309 327/31 |
| 8,405,515 B2 * | 3/2013 | Ishihara ................ E05B 81/78 340/5.72 |
| 9,564,948 B2 | 2/2017 | Arnold et al. |
| 9,788,162 B2 * | 10/2017 | Maguire ................ H01Q 3/24 |

(Continued)

FOREIGN PATENT DOCUMENTS

JP 2008098816 A 4/2008

*Primary Examiner* — Pablo N Tran
(74) *Attorney, Agent, or Firm* — Harness, Dickey & Pierce, P.L.C.

(57) ABSTRACT

An antenna driving apparatus drives an antenna by applying to the antenna a drive voltage having a rectangular waveform switching between a high voltage value and a low voltage value in a predetermined cycle. The antenna driving apparatus includes a high-voltage side switch, a low-voltage side switch, a duty ratio acquisition unit, a drive voltage application unit and a duty ratio switching unit. The duty ratio acquisition unit acquires a set value of a duty ratio as a time ratio at which the drive voltage is at the high voltage value in the rectangular waveform. The drive voltage application unit applies to the antenna the drive voltage by repeating execution of turning the high-voltage side switch into the nonconductive state. The duty ratio switching unit alternately executes switching of the duty ratio between a first duty ratio and a second duty ratio.

9 Claims, 14 Drawing Sheets

(56) References Cited

U.S. PATENT DOCUMENTS

| | | |
|---|---|---|
| 2008/0085733 A1 | 4/2008 | Ochi et al. |
| 2009/0017781 A1* | 1/2009 | Fujii ................. B60R 25/24 455/127.1 |
| 2013/0129016 A1 | 5/2013 | Arnold et al. |
| 2017/0032603 A1* | 2/2017 | Koizumi ............. H01Q 1/3283 |

* cited by examiner (a)

(b)

(c)

(a)

(b)

(c)

(d)

(e)

(f)

$$Dd + CDd = 100$$

ANTENNA DRIVING APPARATUS AND ANTENNA DRIVING METHOD

CROSS REFERENCE TO RELATED APPLICATION

The present application is a continuation application of International Patent Application No. PCT/JP2018/043300 filed on Nov. 23, 2018, which designated the U.S. and claims the benefit of priority from Japanese Patent Application No. 2017-239099 filed on Dec. 13, 2017. The entire disclosures of all of the above applications are incorporated herein by reference.

TECHNICAL FIELD

The present disclosure relates to an antenna driving apparatus and an antenna driving method.

BACKGROUND

With regard to recent vehicles, when it is detected that a user of the vehicle has carried a mobile device (for example, an electronic key or the like) and approached the vehicle, the vehicle determines whether the mobile device is an authorized mobile device by authenticating the mobile device.

SUMMARY

The present disclosure describes an antenna driving apparatus and an antenna driving method for driving an antenna by applying a drive voltage having a rectangular waveform to an antenna for transmitting a radio wave.

DETAILED DESCRIPTION

Figure 1:
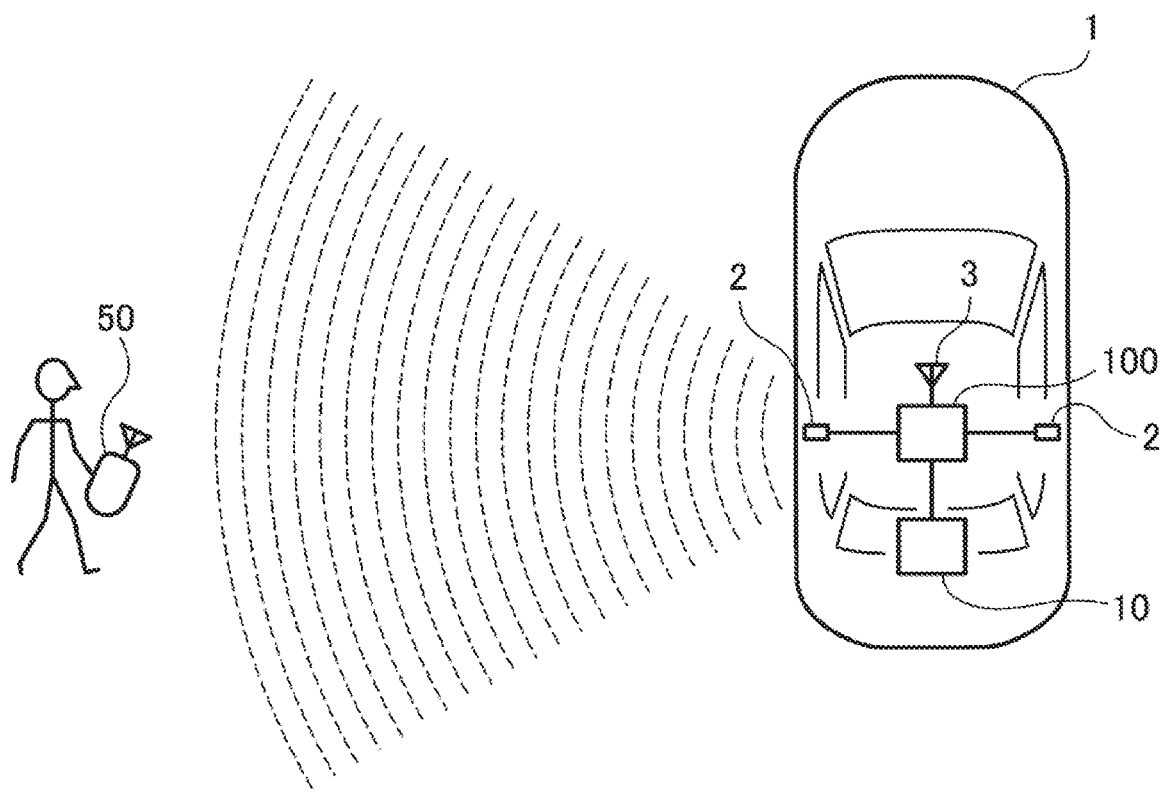
FIG. 1 is an illustrative diagram showing a state in which a vehicle equipped with an antenna driving apparatus according to the present embodiment transmits a radio wave toward a mobile device carried by a user of the vehicle.

Vehicles may provide services such as automatically unlocking doors of the vehicle or turning on an illumination light based on the determination result.

For executing the functions, the vehicle is equipped with an antenna for transmitting a radio wave to the outside or receiving a radio wave from the outside. The antenna transmits the radio wave at a predetermined cycle for searching for the mobile device around the periphery of the vehicle. When a response signal is returned from the mobile device which has received the radio wave, it is determined that the mobile device is present around the vehicle, and the authentication of the mobile device is started.

If an intensity of the radio wave transmitted from the vehicle is too large, the radio wave reaches the mobile device which is present at a distance far from the vehicle, and the mobile device is authenticated. As a result, a situation may occur in which the doors of the vehicle are unlocked despite the fact that the mobile device is located far from the vehicle. To avoid the occurrence of such a situation, it may be required to control the intensity of the radio wave transmitted from the vehicle to have a suitable intensity.

A suitable radio wave intensity may be acquired by setting a drive voltage waveform to be applied to the antenna as a rectangular voltage waveform whose voltage value periodically switches between a high voltage value and a low voltage value, and by changing a time ratio (referred to as duty ratio) at which a voltage having the high voltage value is applied.

However, it may be difficult to secure the durability of the antenna driving apparatus. Each time a drive voltage is applied to the antenna, a large current flows through a particular switch element in the antenna driving apparatus and may lead to the deterioration of the switch element.

In one or more embodiments of the present disclosure, antenna driving apparatus and an antenna driving method which enhance durability are provided.

According to a first aspect of the present disclosure, an antenna driving apparatus drives an antenna to transmit a radio wave by applying to the antenna a drive voltage with a rectangular waveform having a high voltage value and a low voltage value switched between each other in a predetermined cycle. The antenna driving apparatus includes a high-voltage side switch, a low-voltage side switch, a duty ratio acquisition unit, a drive voltage application unit and a duty ratio switching unit. The high-voltage side switch switches the drive voltage to the high voltage value in response to the high-voltage side switch turning into a conductive state. The low-voltage side switch turns into a nonconductive state in response to the high-voltage side switch turning into the conductive state. The low-voltage side switch switches the drive voltage to the low voltage value on a condition that the low-voltage side switch turns into the conductive state in response to the high-voltage side switch turning into the nonconductive state. The duty ratio acquisition unit acquires a set value of a duty ratio as a time ratio at which the drive voltage is at the high voltage value in the rectangular waveform. The drive voltage application unit applies to the antenna the drive voltage having the rectangular waveform by repeating execution of turning the high-voltage side switch into the conductive state and then turning the high-voltage side switch into the nonconductive state at a timing corresponding to the duty ratio in the predetermined cycle. The duty ratio is adopted by the drive voltage application unit to apply the drive voltage. The duty ratio switching unit alternately executes switching of the duty ratio between a first ratio and a second ratio duty ratio in response to satisfying a predetermined switching condition. The second ratio has a complementary relationship with the first duty ratio.

According to a second aspect of the present disclosure, an antenna driving method also drives an antenna transmitting a radio wave by applying to the antenna a drive voltage having a rectangular waveform switching between a high voltage value and a low voltage value at a predetermined cycle. The antenna driving method includes: acquiring a setting of a duty ratio which is a time ratio of the high voltage value in the rectangular waveform, the duty ratio being a first duty ratio; generating the drive voltage having the rectangular waveform corresponding to the duty ratio, and applying the drive voltage to the antenna; and switching the duty ratio from a first duty ratio to a second duty ratio in response to satisfying a predetermined switching condition.

The duty ratio is a time ratio at which a high voltage is applied in a predetermined cycle. When the duty ratio becomes smaller than 50%, the time ratio at which the high voltage is applied becomes shorter than half. Therefore, according to the first aspect and the second aspect of the present disclosure, a time during which the current flows in the high-voltage side switch is shorter, a time during which the current flows in the low-voltage side switch is longer, and the current flows in a biased manner in the low-voltage side switch. When the duty ratio is switched to the complementary duty ratio, the time during which the current flows in the high-voltage side switch becomes longer, and the time during which the current flows in the low-voltage side switch becomes shorter, so that the current flows in a biased manner in the high-voltage side switch. When the duty ratios of the two rectangular waveforms are complementary to each other, the frequency components of the rectangular waveforms are the same, so that even if the duty ratio of the drive voltage applied to the antenna is switched to the complementary duty ratio, the value of the current flowing through the antenna does not change. For that reason, the antenna is driven while switching the duty ratio of the drive voltage to the complementary duty ratio, the times during which the current flows through the high-voltage side switch and the low-voltage side switch can be equalized. As a result, it is possible to improve the durability of the antenna driving apparatus.

The following describes embodiments to clarify the content of the present disclosure.

A. Device Configuration:

FIG. 1 shows a rough internal structure of a vehicle 1 on which an antenna driving apparatus 100 of the present embodiment is mounted. As shown in FIG. 1, the antenna driving apparatus 100 is mounted on the vehicle 1, and an antenna 2 for transmitting a radio wave and a reception antenna 3 for receiving the radio wave are connected to the antenna driving apparatus 100. When the antenna driving apparatus 100 receives transmission data from a control device 10 mounted on the vehicle 1, the antenna driving apparatus 100 drives the antenna 2 based on the transmission data to transmit the radio wave to the outside of the vehicle 1. When the radio wave has been received by a mobile device 50 carried by a user of the vehicle 1, the mobile device 50 transmits back the radio wave, and the returned radio wave is received by the reception antenna 3. The control device 10 of the vehicle 1 recognizes that the mobile device 50 exists in a surrounding area, and authenticates the mobile device 50 by communicating with the mobile device 50 through the antenna 2 and the reception antenna 3. As a result, if the authentication succeeds, services are provided to the user of the vehicle 1, such as enabling a door of the vehicle 1 to be unlocked or illuminating the surroundings of the vehicle 1.

If the intensity of the radio wave transmitted from the antenna 2 is large, the radio wave reaches the mobile device 50 located far from the vehicle 1, and the mobile device 50 is authenticated. As a result, if the authentication succeeds, the door of the vehicle 1 is permitted to be unlocked. It may not be desirable that the door is permitted to be unlocked despite the fact that the mobile device 50 is located far from the vehicle 1. For that reason, it may be required to set the radio wave intensity of the radio wave transmitted from the antenna 2 to an appropriate intensity so that the radio wave does not reach the mobile device 50 located far from the vehicle 1.

As a method in which the antenna 2 is driven with lower power and the radio wave intensity may be adjusted, a method in which the antenna 2 is driven by use of a drive voltage having a rectangular waveform has been known. In the above method, a drive voltage having a rectangular waveform is repeatedly applied at a cycle corresponding to a resonance frequency of the antenna 2 so that the antenna 2 may be driven even with lower power by leveraging a resonance of the antenna 2. Further, if a duty ratio representing a time ratio of a high voltage value in the rectangular waveform is changed, a resonant intensity of the antenna 2 may be changed, so that the radio wave intensity of the radio wave transmitted from the antenna 2 may also be adjusted.

In the above method, however, a current tends to flow in a biased manner to some of switch elements among multiple switch elements mounted on a driving device for applying a drive voltage to the antenna 2, and a lifetime of the driving device is shortened. Therefore, the antenna driving apparatus 100 according to the present embodiment adopts the following internal structure.

Figure 2:
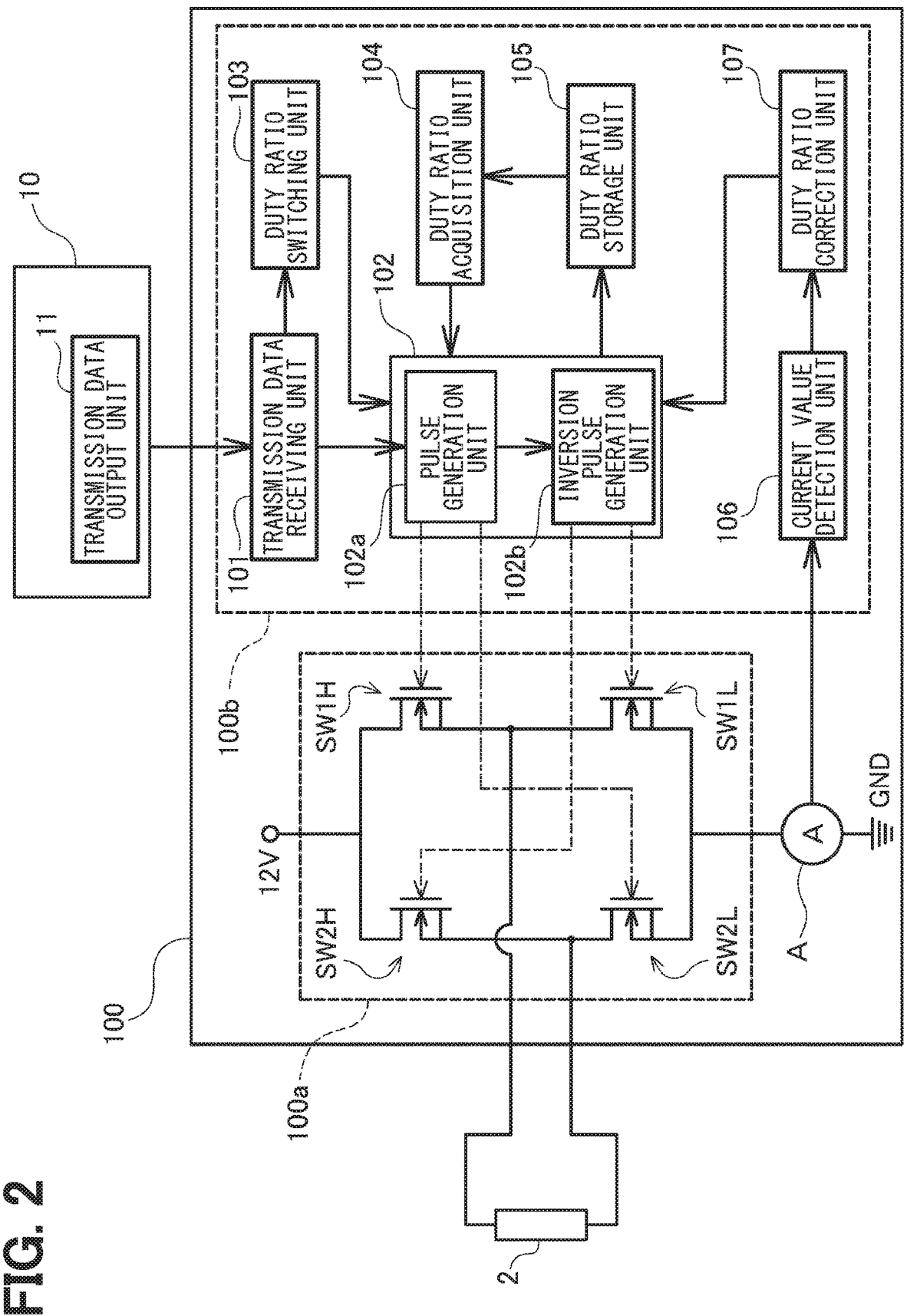
FIG. 2 is a block diagram showing an internal structure of the antenna driving apparatus according to the present embodiment.

FIG. 2 shows a rough internal structure of the antenna driving apparatus 100 according to the present embodiment. As shown in FIG. 1, the antenna driving apparatus 100 includes a full bridge circuit 100a, an ammeter A, and a drive control unit 100b.

The full bridge circuit 100a includes two of a switch element SW1H and a switch element SW1L connected in series with each other, the switch element SW1H is connected to a DC power supply of 12 V (for example, a battery), and the switch element SW1L is grounded to the ground GND through an ammeter A.

The full bridge circuit 100a also includes two of a switch element SW2H and a switch element SW2L that are also connected in series with each other, and the two switch elements SW2H and SW2L are connected in parallel to the two switch elements SW1H and SW1L described above. Therefore, the switch element SW2H is connected to the DC power supply of 12 V as well as the switch element SW1H, and the switch element SW2L is grounded to the ground GND through the ammeter A as well as the switch element SW1L.

An electric wire drawn out from between the switch element SW1H and the switch element SW1L is connected to one end side of the antenna 2, and an electric wire drawn out from between the switch element SW2H and the switch element SW2L is connected to the other end side of the antenna 2.

A switch element called a power transistor is used as each of the four switch elements SW1H, SW1L, SW2H, and SW2L. Although there are multiple types of power transistors, each of the power transistors has three terminals including one control terminal. When the control terminal is set to a Hi state, the other two terminals are rendered conductive. When the control terminal is set to a Low state, the other two terminals are rendered nonconductive. In the following description, in order to simplify the description, the setting of the control terminal of the switch element to the Hi state is expressed as "the switch element is set to the Hi state", and the setting of the control terminal of the switch element to the Low state is expressed as "the switch element is set to the Low state".

Figure 3:
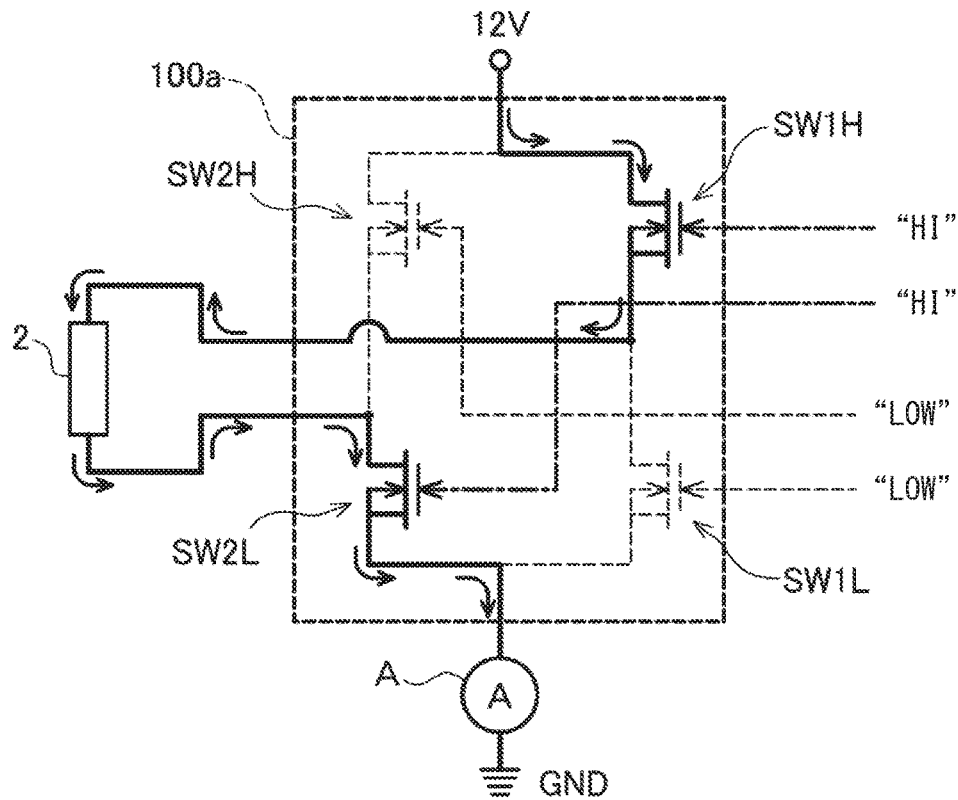
FIG. 3 is an illustrative diagram showing a state in which the antenna driving apparatus according to the present embodiment applies to an antenna a drive voltage having a rectangular waveform.
Figure 3:
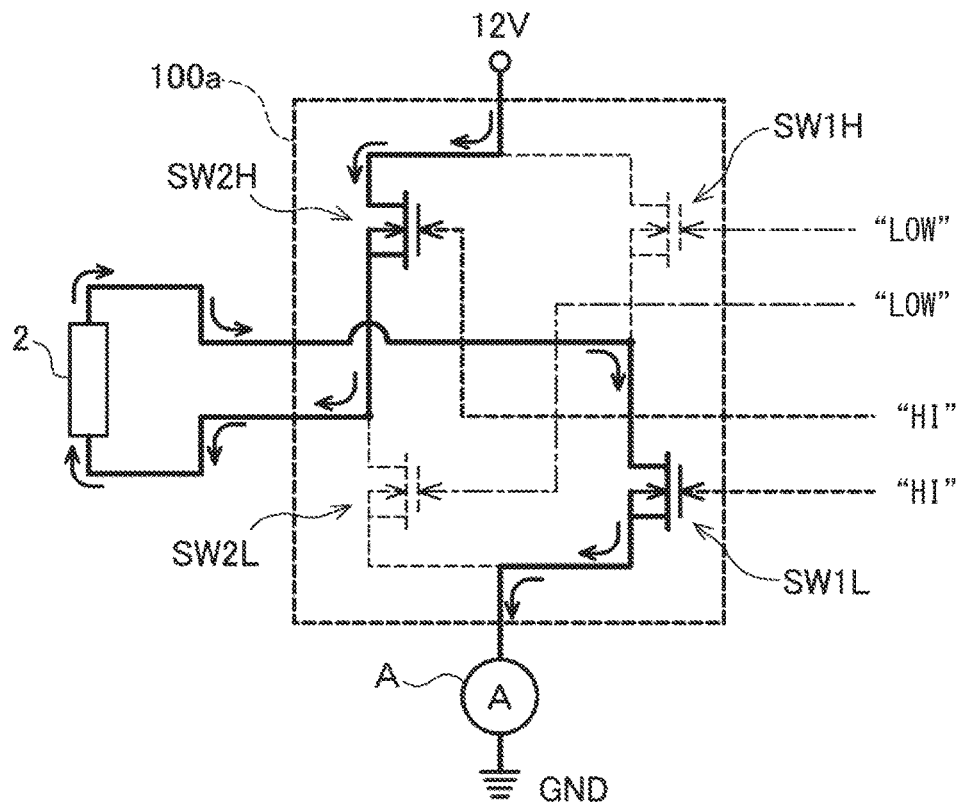

FIG. 3 shows the operation of the full bridge circuit 100a. As shown in (a) of FIG. 3, the switch element SW1H and the switch element SW2L are set to the Hi state, and the switch element SW2H and the switch element SW1L are set to the Low state. As described above, since the switch element in the Hi state is rendered conductive and the switch element in the Low state is rendered nonconductive, the current flows to the ground GND through the switch element SW2L after the current has flowed through the switch element SW1H to the antenna 2 from the DC power supply of 12 V, as indicated by thick solid arrows in (a) of FIG. 3.

As shown in (b) of FIG. 3, the switch element SW2H and the switch element SW1L are set to the Hi state, and the switch element SW1H and the switch element SW2L are set to the Low state. As indicated by thick solid arrows in (b) of FIG. 3, after the current has flowed into the antenna 2 through the switch element SW2H from the DC power supply of 12 V, the current flows to the ground GND through the switch element SW1L.

The full bridge circuit 100a sets the switch element SW1H and the switch element SW2L in one group, sets the switch element SW2H and the switch element SW1L in the other group, sets the other group to the Low state when one group is set to the Hi state, and sets the other group to the Hi state when one group is set to the Low state, thereby being capable of reversing the direction of the current flowing through the antenna 2. Even when the current flows in either direction through the antenna 2, the current flows through the ammeter A in the same direction.

As shown in FIG. 2, the drive control unit 100b of the antenna driving apparatus 100 includes a transmission data receiving unit 101, a drive voltage application unit 102, a duty ratio switching unit 103, a duty ratio acquisition unit 104, a duty ratio storage unit 105, a current value detection unit 106, and a duty ratio correction unit 107. Those "units" are abstract concepts in which the inside of the drive control unit 100b of the antenna driving apparatus 100 is classified for simplicity, focusing on the functions provided in the antenna driving apparatus 100 to drive the antenna 2 through the full bridge circuit 100a described above. Therefore, the drive control unit 100b of the antenna driving apparatus 100 is not physically divided into those "units". Those "units" may be realized as a computer program to be executed by a CPU, may be realized as an electronic circuit including an LSI and a memory, or may be realized by combining the computer program with the electronic circuit.

The transmission data receiving unit 101 is connected to the control device 10 mounted on the vehicle 1. The transmission date receiving unit 101 receives transmission data output from the transmission data output unit 11 of the control device 10, and outputs the transmission data to the drive voltage application unit 102.

The drive voltage application unit 102 includes a pulse generation unit 102a and an inversion pulse generation unit 102b. When the pulse generation unit 102a receives the transmission data from the transmission data receiving unit 101, the drive voltage application unit 102 generates pulse data corresponding to the transmission data and outputs the generated pulse data to the switch element SW1H and the switch element SW2L. The pulse data generated by the pulse generation unit 102a is data in which the Hi state and Low state described above are alternately repeated.

When generating the pulse data, the pulse generation unit 102a receives the duty ratio from the duty ratio acquisition unit 104, and generates the pulse data such that the Hi state and the Low state are switched to each other at a ratio corresponding to the duty ratio. An appropriate duty ratio is set in advance in the duty ratio storage unit 105, and the duty ratio acquisition unit 104 reads out the duty ratio set in the duty ratio storage unit 105 and outputs the read duty ratio to the pulse generation unit 102a of the drive voltage application unit 102.

The duty ratio is a time ratio of the Hi state in the pulse data. Since the pulse data is data in which one rectangular waveform, which becomes in the Low state after being in the Hi state, is repeated at a predetermined cycle, the ratio occupied by the Hi state in one cycle becomes the duty ratio. The duty ratio is usually expressed in percent (%).

The pulse generation unit 102a also outputs the generated pulse data to the inversion pulse generation unit 102b, and the inversion pulse generation unit 102a generates inversion pulse data based on the pulse data. The inversion pulse data is pulse data that is in the Low state while the pulse data is in the Hi state, and is in the Hi state while the pulse data is in the Low state. The inversion pulse generation unit 102b outputs the generated inversion pulse data to the switch element SW2H and the switch element SW1L.

When the pulse generation unit 102a of the drive voltage application unit 102 outputs the pulse data which is in the Hi state, the inversion pulse generation unit 102b outputs the inversion pulse data which is in the Low state, and thus a state shown in (a) of FIG. 3 is obtained. When the pulse generation unit 102a outputs the pulse data which is in the Low state, the inversion pulse generation unit 102b outputs the inversion pulse data which is in the Hi state, and thus a state shown in (b) of FIG. 3 is obtained.

The pulse data is output from the pulse generation unit 102a to the switch element SW1H and the switch element SW2L, and the inversion pulse data is output from the inversion pulse generation unit 102b to the switch elements SW2H and SW1L to cause an AC current to flow through the antenna 2, and therefore the antenna 2 is driven.

The current value detection unit 106 detects the current value by the ammeter A and outputs the detected current value to the duty ratio correction unit 107. As described above with reference to FIG. 3, the current value detected by the ammeter A is the value of the current flowing through the antenna 2, and the value of the current flowing through the antenna 2 represents the radio wave intensity of the radio wave transmitted from the antenna 2. Since the radio wave intensity of the antenna 2 is set to an appropriate intensity, the current value detected by the ammeter A should also be a predetermined current value.

When receiving the current value from the current value detection unit 106, the duty ratio correction unit 107 determines whether the current value falls within a predetermined range. When the current value detected by the ammeter A is larger than the predetermined current range, it is considered that the radio wave intensity of the antenna 2 is larger than the appropriate intensity. When the current value is smaller than the predetermined current range, it is considered that the radio wave intensity is smaller than the appropriate radio wave intensity. When the current value does not fall within the predetermined range, the duty ratio correction unit 107 corrects the duty ratio used by the pulse generation unit 102a of the drive voltage application unit 102 when generating the pulse data. A method of correcting the duty ratio will be described later in detail.

When the duty ratio is corrected by the duty ratio correction unit 107, the drive voltage application unit 102 stores the corrected duty ratio in the duty ratio storage unit 105. With the above configuration, when the transmission data is received from the control device 10 to transmit the radio wave next time, the duty ratio stored in the duty ratio storage unit 105 may be used, so that the radio wave may be transmitted with an appropriate radio wave intensity.

The drive control unit 100b of the antenna driving apparatus 100 according to the present embodiment includes the duty ratio switching unit 103. When a predetermined switching condition (or a predetermined switching moment) to be described later is satisfied, the duty ratio switching unit 103 switches the duty ratio used by the pulse generation unit 102a of the drive voltage application unit 102 to generate the pulse data to a duty ratio (hereinafter, complementary duty ratio) having a complementary relationship to the duty ratio. In this example, a duty ratio Db having a complementary relationship to a certain duty ratio Da indicates a duty ratio of 100% when the duty ratio Da and the duty ratio Db are added to each other. For example, a duty ratio that is complementary to the duty ratio of 45% (that is, a complementary duty ratio) is 55%, and a complementary duty ratio to the duty ratio of 32% is 68%.

The complementary duty ratio to the duty ratio of 68% is 32%. As described above, the two duty ratios having the complementary relationship to each other have the complementary duty ratio on the other side as viewed from one side, and the complementary duty ratio on one side as viewed from the other side.

When the duty ratio is switched by the duty ratio switching unit 103, the drive voltage application unit 102 stores the switched duty ratio in the duty ratio storage unit 105.

In the antenna driving apparatus 100 according to the present embodiment, since the duty ratio is switched to the complementary duty ratio every time the predetermined switching condition is satisfied, the lifetime of the antenna driving apparatus 100 may be extended. This is enabled because the radio wave is transmitted by use of the resonance of the antenna 2. Therefore, the above configuration will be described in a supplementary manner.

Figure 4:
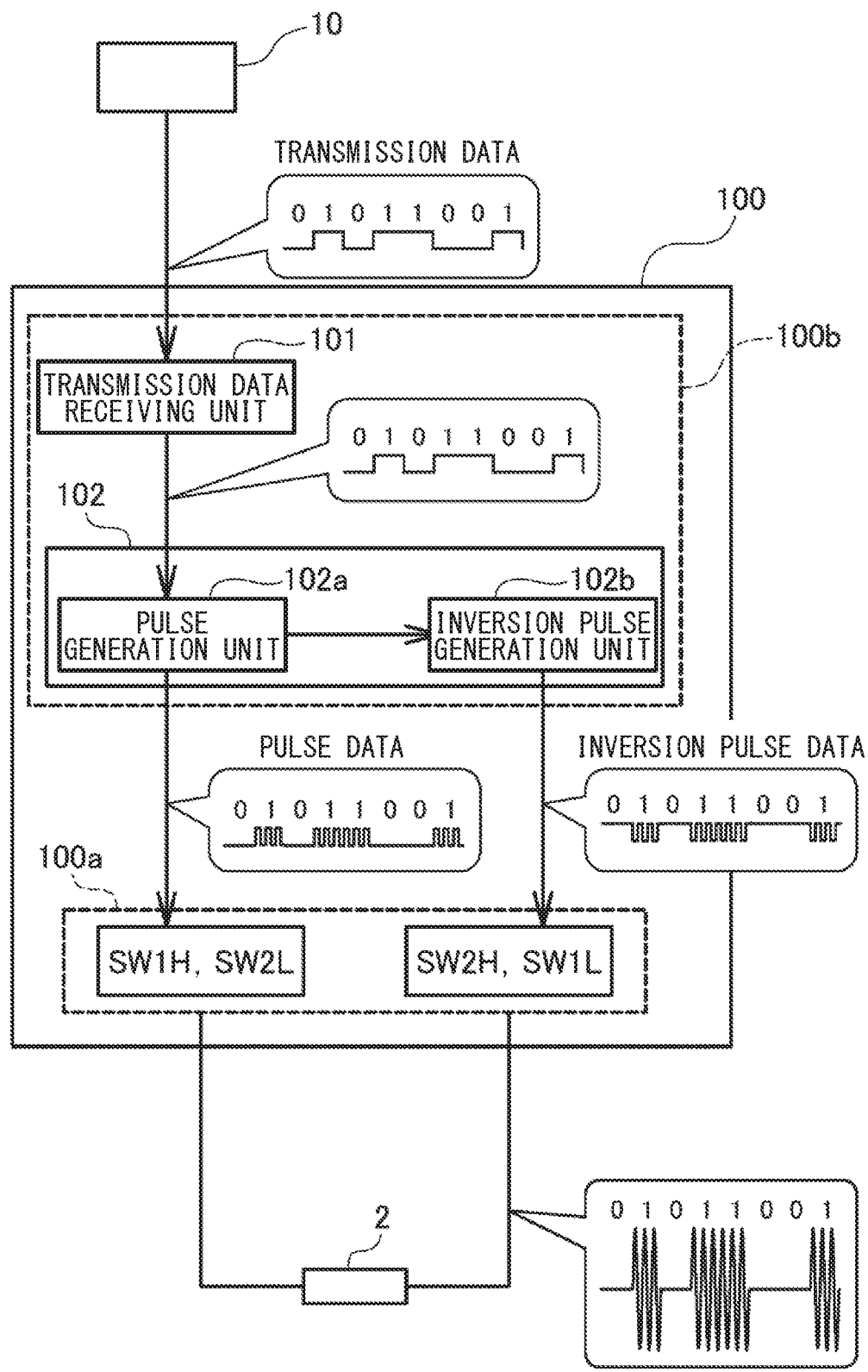
FIG. 4 is an illustrative diagram showing a state in which the antenna driving apparatus according to the present embodiment applies a drive voltage to the antenna in accordance with transmission data.

FIG. 4 shows how the antenna driving apparatus 100 according to the present embodiment drives the antenna 2 in accordance with the transmission data from the control device 10. As an example, it may be assumed that the transmission data output from the control device 10 is 8-bit data of "01011001". The transmission data is supplied to the pulse generation unit 102a of the drive voltage application unit 102 through the transmission data receiving unit 101. The pulse generation unit 102a alternately repeats the Hi state and the Low state in a portion where the transmission data is "1", and generates the pulse data which is in the Low state in a portion where the transmission data is "0". In the pulse data of the portion where the transmission data is "1", one rectangular waveform, which is in the Low state after being in the Hi state, is repeated at a cycle corresponding to the resonance frequency of the antenna 2. The duty ratio is the data of the duty ratio acquired by the duty ratio acquisition unit 104 described above. The pulse generation unit 102a outputs the above pulse data to the switch element SW1H and the switch element SW2L of the full bridge circuit 100a.

If the resonance frequency of the antenna 2 is determined, one cycle is also determined. However, the resonance frequency actually varies depending on an individual difference of the antenna 2. The cycle corresponding to the resonance frequency has a different value. However, it is not practical to make the cycle of the pulse data different depending on the individual difference of the antenna 2. The term "resonance frequency of the antenna 2" in the present specification does not mean a resonance frequency in a strict sense which differs depending on an individual difference of the antenna 2, but refers to a resonance frequency in design of the antenna 2 or a representative resonance frequency.

The inversion pulse generation unit 102b generates inversion pulse data based on the pulse data generated by the pulse generation unit 102a. The inversion pulse data is data that is in the Low state when the pulse data is in the Hi state. The inversion pulse date is in the Hi state when the pulse data is in the Low state. The inversion pulse generation unit 102b outputs the generated inversion pulse data to the switch element SW2H and the switch element SW1L of the full bridge circuit 100a.

Since the full bridge circuit 100a operates as described above with reference to FIG. 3, in a period during which the transmission data is "1", a current whose direction is reversed flows through the antenna 2 each time the Hi state and the Low state of the pulse data are switched to each other. Since the cycle of the current whose direction is reversed is a cycle corresponding to the resonance frequency of the antenna 2, a large current due to resonance flows through the antenna 2 as shown in FIG. 4. In the period during which the transmission data is "0", the above resonance does not occur. Therefore, a large current does not flow through the antenna 2.

An amplitude of the current flowing through the antenna 2 by resonant may be adjusted by the duty ratio of the pulse data in the period during which the transmission data is "1".

Figure 5:
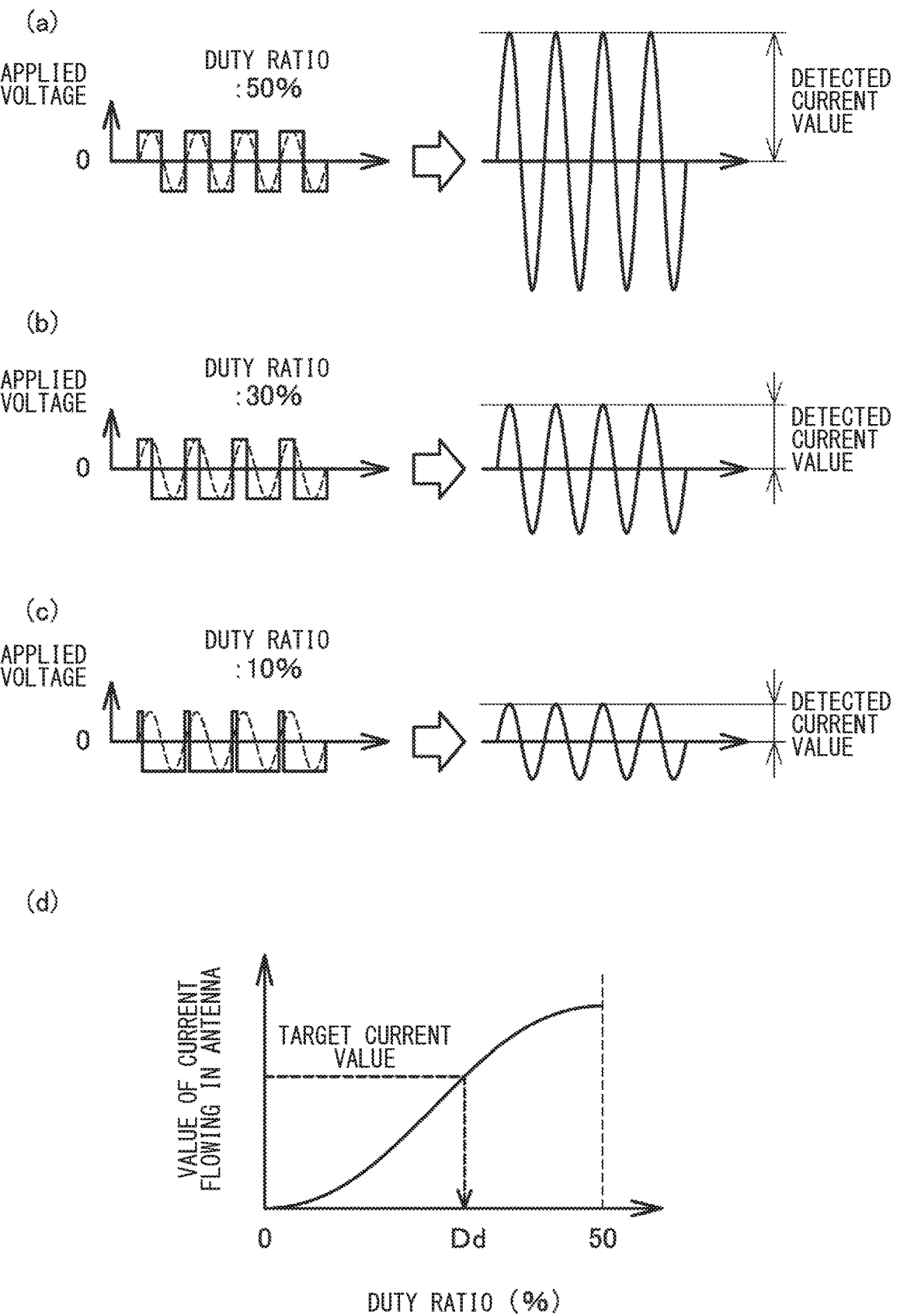
FIG. 5 is an illustrative diagram showing a reason why the intensity of a radio wave transmitted by the antenna may be changed by changing a duty ratio of the rectangular waveform.

FIG. 5 shows the reason why the current value of the antenna 2 may be adjusted by correcting the duty ratio of the pulse data in the period during which the transmission data is "1". First, when a waveform repeated at a predetermined cycle is Fourier expanded, the waveform may be divided into a sine wave having a frequency corresponding to the cycle (sometimes referred to as a base wave) and a sine wave having a frequency which is an integral multiple of the base wave (sometimes referred to as a harmonic wave).

A voltage waveform (hereinafter, applied voltage waveform) applied to the antenna 2 when the duty ratio of the pulse data is 50% will be considered. (a) of FIG. 5 shows the waveform of the applied voltage when the duty ratio of the pulse data is 50%. The polarity of the applied voltage is such that a direction in which the pulse data is applied when the pulse data is in the Hi state is "positive". A sine wave indicated by a thin dashed line in (a) of FIG. 5 represents a base wave. As shown in the figure, pulse data having the duty ratio of 50% may be approximated to some extent using the base wave. When the pulse data having the duty ratio of 50% is Fourier expanded, the amplitude of the base wave is the largest, and the amplitude of the harmonic is smaller than the amplitude of the base wave.

The cycle of the pulse data (that is, a cycle of the base wave of the applied voltage waveform) is a period corresponding to the resonance frequency of the antenna 2. For that reason, in the situation where the duty ratio of the pulse data is 50%, a voltage of the base wave having the largest amplitude is applied to the antenna 2 to generate strong resonance, as a result of which a large current flows through the antenna 2, and the current value detected by the ammeter A also increases.

A situation in which the duty ratio of the pulse data becomes 30% is considered. In (b) of FIG. 5, the applied voltage waveform when the duty ratio of the pulse data is 30% is indicated by a solid line, and the base wave of the applied voltage waveform is indicated by a thin dashed line. When the duty ratio is reduced to 30% as compared with the situation in which the duty ratio shown in (a) of FIG. 5 is 50%, the degree to which the applied voltage waveform is approximated by the base wave is also reduced. When the duty ratio of the pulse data decreases from 50% to 30%, the amplitude of the base wave at the time of Fourier expansion decreases, and the amplitude of the harmonic increases. Since the resonance is not affected even if the amplitude of the harmonic becomes larger, the current flowing through the antenna 2 becomes smaller in response to the amplitude of the base wave becoming smaller, and the current value detected by the ammeter A also becomes smaller.

(c) of FIG. 5 shows a situation in which the duty ratio of the pulse data is 10%. As apparent from a comparison between the applied voltage waveform indicated by a solid line and the base wave indicated by a thin dashed line, when the duty ratio of the pulse data decreases from 30% to 10%, the degree to which the applied voltage waveform is approximated by the base wave further decreases. Correspondingly, the amplitude of the base wave when the applied voltage waveform is Fourier expanded is further reduced, and the current flowing through the antenna 2 is further reduced. As a result, the current value detected by the ammeter A is further reduced. The same applies to the situation in which the duty ratio of the pulse data is larger than 50%. In other words, as the duty ratio increases from 50%, the degree to which the applied voltage waveform is approximated by the base wave decreases. As a result, the amplitude of the base wave at the time of Fourier expansion of the applied voltage waveform is reduced, and the current flowing through the antenna 2 is also reduced.

The value of the current flowing through the antenna 2 becomes the largest when the duty ratio is 50%, and becomes smaller as the duty ratio becomes smaller. (d) of FIG. 5 conceptually shows a relationship between the duty ratio of the pulse data and the value of the current flowing through the antenna 2. As is apparent from the drawing, a duty ratio Dd such that the value of the current flowing through the antenna 2 becomes the target current value may be obtained. When the pulse generation unit 102a of the drive voltage application unit 102 generates the pulse data having the duty ratio Dd, the target current value may be caused to flow through the antenna 2, and a radio wave having an appropriate radio wave intensity may be transmitted.

When the voltage value of the DC power supply falls from 12 V, for example, by exhausting the battery, or when the voltage value becomes higher than 12 V by replacing the battery to a new one, the duty ratio is corrected in accordance with the current value detected by the ammeter A. The value of the current flowing through the antenna 2 may be controlled to the target current value.

When the value of the current flowing through the antenna 2 is adjusted by changing the duty ratios as described above, the current flows to a particular switch element in the four switch elements SW1H, SW1L, SW2H, and SW2L of the full bridge circuit 100a in a biased manner. As a result, the deterioration of the switch element may be accelerated, and the durability of the antenna driving apparatus 100 may be lowered. The following describes the reasons.

Figure 6:
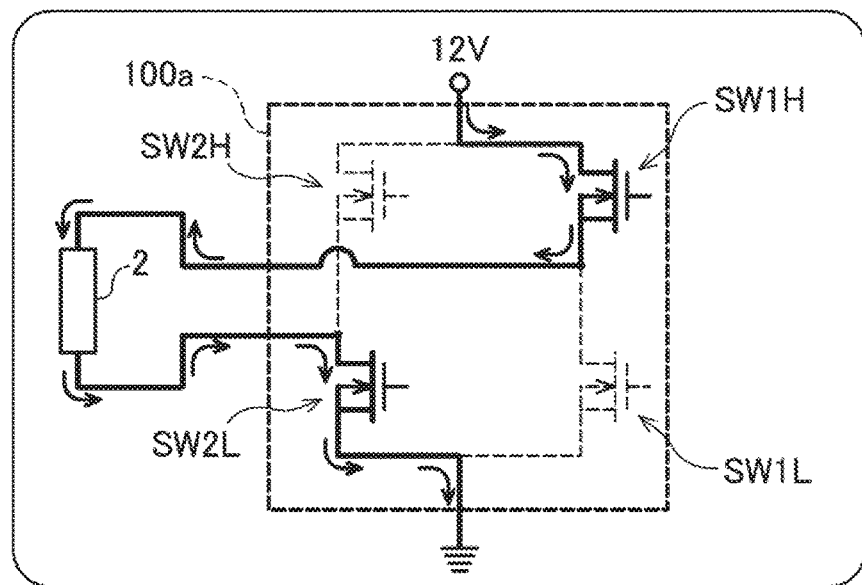
FIG. 6 is an illustrative diagram showing a state in which a difference occurs in time during which a current flows through multiple switch elements of the antenna driving apparatus.
Figure 6:
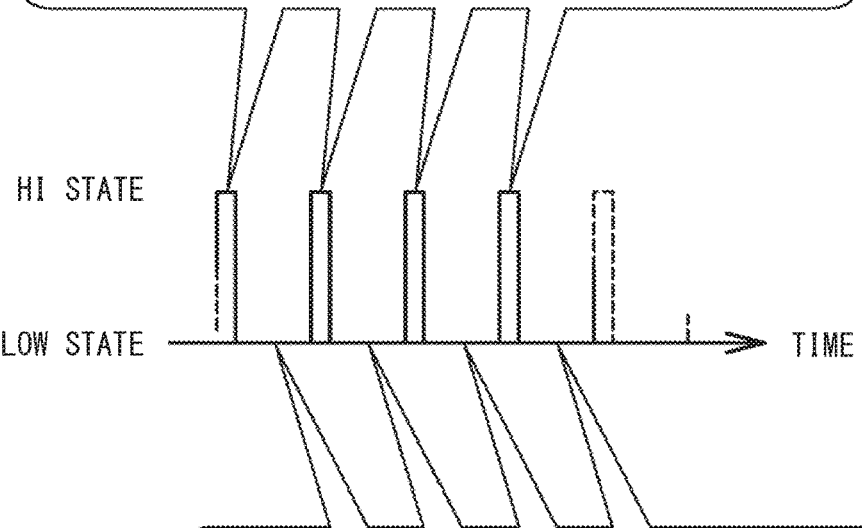
Figure 6:
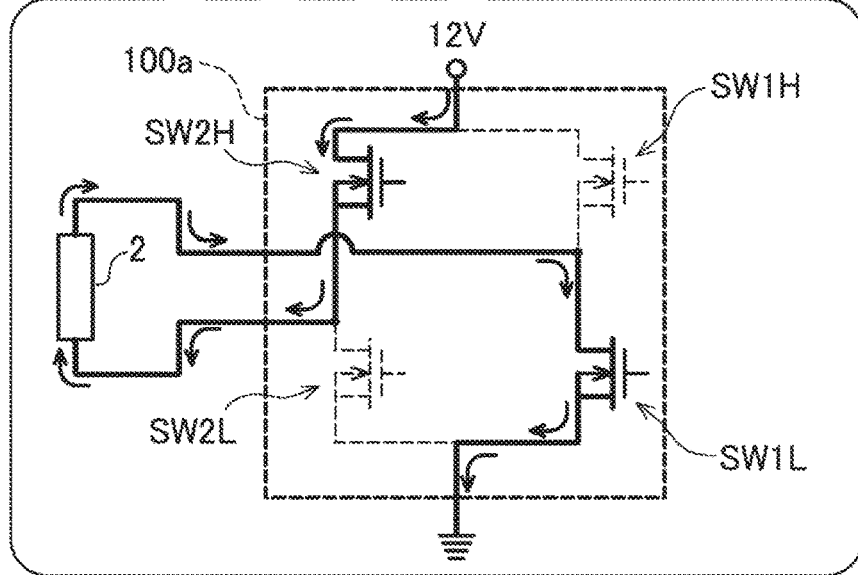

FIG. 6 shows the reason why a current flows to the particular switch element in a biased manner when the value of the current flowing through the antenna 2 is adjusted by changing the duty ratio. As described above, when the pulse data is in the Hi state, a current flows through the switch element SW1H and the switch element SW2L. When the pulse data is in the Low state, a current flows through the switch element SW2H and the switch element SW1L. When the duty ratio of the pulse data is 50%, the time during which the current flows in the switch element SW2H and the switch element SW1L becomes equal to the time during which the current flows in the switch element SW1H and the switch element SW2L. However, the time during which the current flows in the switch element SW2H and the switch element SW1L becomes longer than the time during which the current flows in the switch element SW1H and the switch element SW2L. As the duty ratio is smaller, a difference in time for the current to flow is larger.

The duty ratio Dd of the pulse data is set so that the magnitude of the current flowing through the antenna 2 becomes the target current value as described above with reference to (d) of FIG. 5, and an arbitrary duty ratio Dd cannot be selected. As a result, the current flows through the switch element SW2H and the switch element SW1L in a biased manner as compared with the switch element SW1H and the switch element SW2L. The switch element SW2H and the switch element SW1L may be deteriorated faster than the switch element SW1H and the switch element SW2L.

The antenna driving apparatus 100 according to the present embodiment switches the duty ratio of the pulse data to a complementary duty ratio (that is, a complementary duty ratio) in order to avoid a situation in which a current flows biased to the particular switch element of the full bridge circuit 100a.

Figure 7:
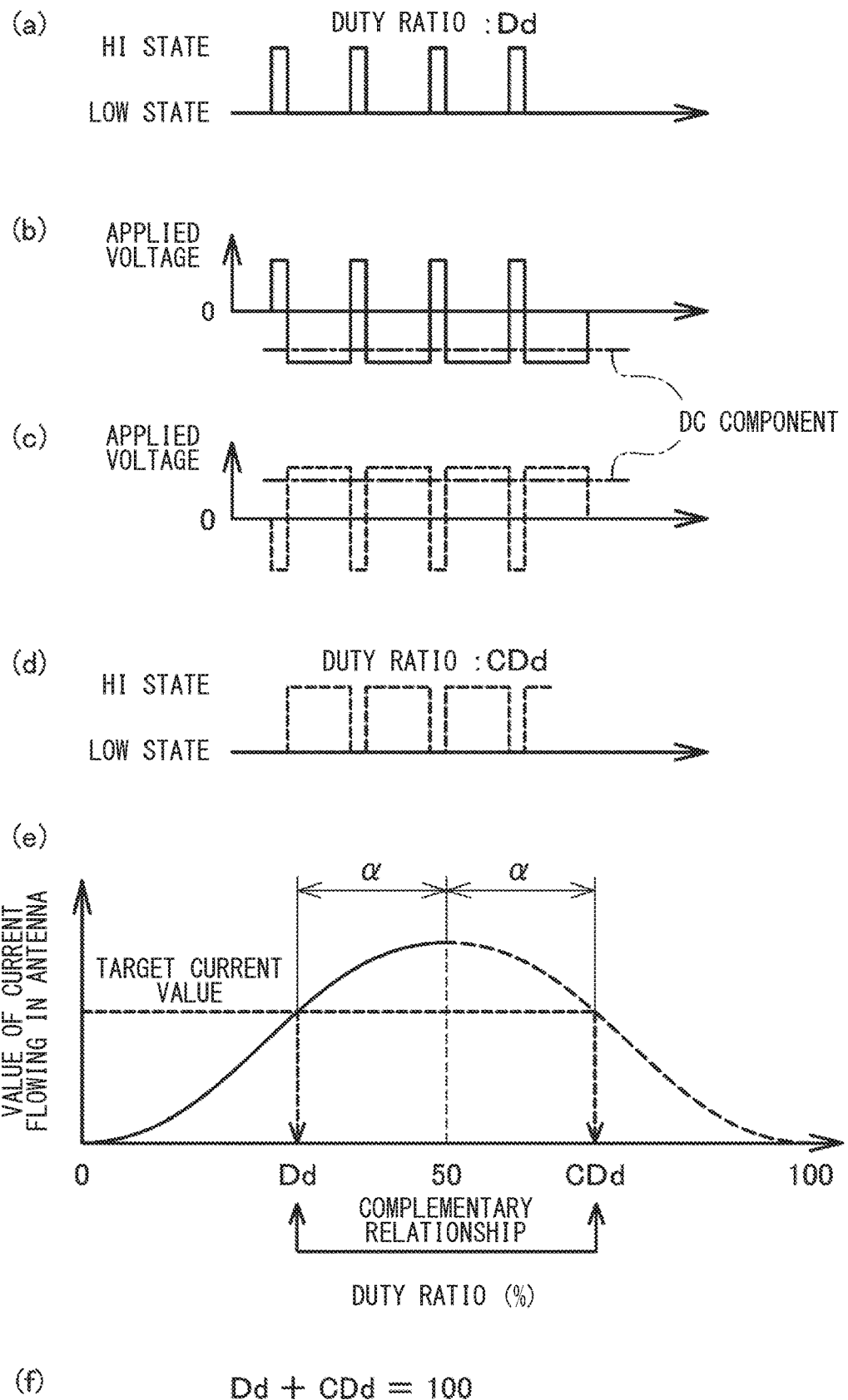
FIG. 7 is an illustrative diagram showing a reason why the times during which the current flows through the multiple switch elements may be equalized by switching the duty ratio to a duty ratio having a complementary relationship to each other.

FIG. 7 shows the reason why the current may be prevented from flowing to the particular switch element of the full bridge circuit 100a in a biased manner by switching the duty ratio of the pulse data to the complementary duty ratio.

In a situation where the pulse data is assumed to have the arbitrary duty ratio Dd shown in (a) of FIG. 7, a voltage applied to the antenna 2 corresponding to the pulse data has an applied voltage waveform shown in (b) of FIG. 7. The applied voltage waveform as shown in (c) of FIG. 7 is considered by inverting the positive and negative of the applied voltage waveform. Even if the sign is inverted, the amplitude of the sine wave of the base wave and the amplitude of the sine wave of the harmonic wave are not changed when Fourier expansion is performed. When an applied voltage waveform indicated by a solid line in (b) of FIG. 7 is applied to the antenna 2, and when an applied voltage waveform indicated by a dashed line in (c) of FIG. 7 is applied to the antenna 2, the resonant intensity generated in the antenna 2 is the same, and the value of the current flowing through the antenna 2 is also the same.

Since the applied voltage waveform shown in (b) of FIG. 7 is different from the applied voltage waveform of (c) of FIG. 7 obtained by inverting the positive and negative of the applied voltage waveform, the obtained result should be different depending on which voltage waveform is applied. However, a difference between the two voltage waveforms is only a difference in a DC component (that is, an average value), and the magnitude of the frequency component is the same. Since the current flows to the antenna 2 by use of the resonance, the effect of the difference in the DC component is only negligible compared to the current value flowing to the antenna 2 due to the resonance. For that reason, the antenna 2 may be driven in the same manner as in the situation of applying the applied voltage waveform of (b) of FIG. 7 even when the applied voltage waveform of (c) of FIG. 7 in which the positive and negative are inverted is applied.

The pulse data corresponding to the applied voltage waveform of (c) of FIG. 7 is pulse data shown in (d) of FIG. 7. When the pulse data shown in (a) of FIG. 7 is compared with the pulse data shown in (d) of FIG. 7, the pulse data of (a) of FIG. 7 has a smaller time ratio to be in the Hi state and a larger time ratio to be in the Low state, whereas the pulse data of (d) of FIG. 7 has a larger time ratio to be in the Hi state and a smaller time ratio to be in the Low state.

In the pulse data of (a) of FIG. 7, a time during which the current flows in the switch element SW2H and the switch element SW1L is longer, and a time during which the current flows in the switch element SW1H and the switch element SW2L is shorter. In the pulse data of (d) of FIG. 7, a time during which the current flows in the switch element SW1H and the switch element SW2L is longer, and a time during which the current flows in the switch element SW2H and the switch element SW1L is shorter.

Since the value of the current flowing through the antenna 2 is the same in the situation of using the pulse data of (a) of FIG. 7 and the situation of using the pulse data of (d) of FIG. 7, if the pulse data of (a) of FIG. 7 and the pulse data of (d) of FIG. 7 are alternately used, the times during which the current flow through the respective switching elements SW1H, SW1L, SW2H, and SW2L of the full bridge circuits 100a may be equalized.

The pulse data of (a) of FIG. 7 and the pulse data of (d) of FIG. 7 have complementary duty ratios. In other words, as shown in (e) of FIG. 7, if the duty ratio Dd of the pulse data in (a) of FIG. 7 is 50-α(%), a duty ratio CDd of the pulse data in (d) of FIG. 7 is 50+α(%). As shown in (f) of FIG. 7, Dd+CDd=100 is established.

If the duty ratio of the pulse data used to drive the antennas 2 is alternately switched to a duty ratio having a complementary relationship with each other (that is, a complementary duty ratio), the times during which the current flows through the respective switch elements SW1H, SW1L, SW2H, and SW2L of the full bridge circuits 100a may be equalized.

In the antenna driving apparatus 100 according to the present embodiment, the duty ratio switching unit 103 shown in FIG. 2 is provided to switch the duty ratio of the pulse data to the complementary duty ratio every time a predetermined switching condition is satisfied. Hereinafter, an antenna driving process to be executed by the antenna driving apparatus 100 according to the present embodiment to drive the antenna 2 is described.

Figure 8:
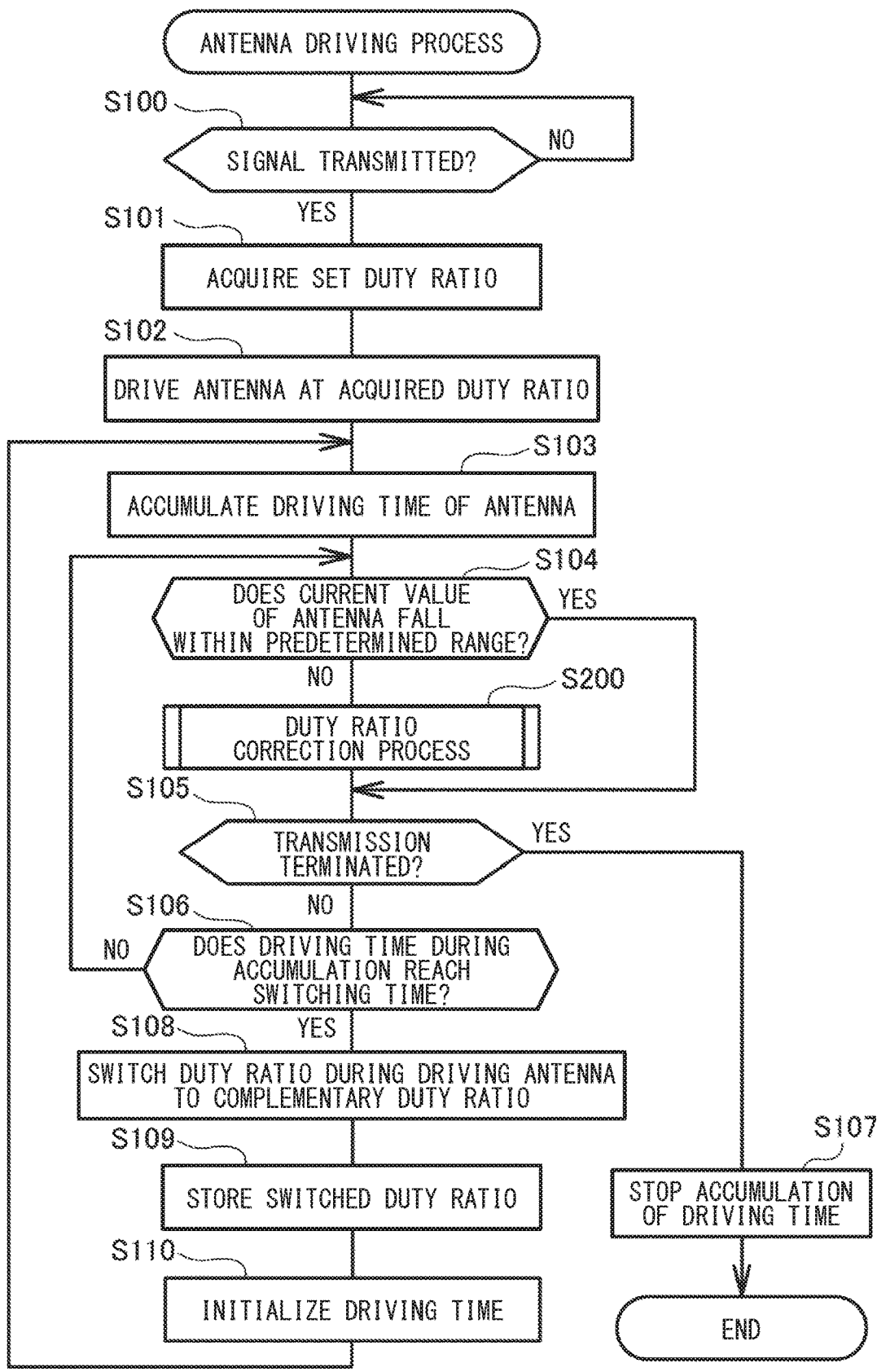
FIG. 8 is a flowchart showing an antenna driving process executed when the antenna driving apparatus according to the present embodiment drives the antenna.

B. Antenna Driving Process:

FIG. 8 is a flowchart showing the antenna driving process to be executed by the antenna driving apparatus 100 according to the present embodiment.

As shown in FIG. 8, when the antenna driving process is started, it is determined whether a signal is transmitted from the antenna 2 (S100). As described above with reference to FIG. 1 or FIG. 2, the transmission data transmitted from the antenna 2 by the antenna driving apparatus 100 according to the present embodiment is transmitted from the control device 10. When the transmission data is not transmitted from the control device 10, it is determined that the signal is not to be transmitted (no in S100), and the same determination is repeated so that a waiting state is set.

When the transmission data is transmitted from the control device 10, it is determined that the signal is to be transmitted (yes in S100), and the duty ratio preset in the memory of the antenna driving apparatus 100 is acquired (S101).

The antenna 2 is driven by generating the pulse data and the inversion pulse data with the acquired duty ratio and outputting the pulse data and the inversion pulse data to the switching elements SW1H, SW1L, SW2H, and SW2L of the full bridge circuit 100a (S102).

The antenna driving apparatus 100 according to the present embodiment accumulates a driving time of the antenna 2 (S103). The reason why the driving time is accumulated is to detect a timing at which the duty ratio at the time of driving the antenna 2 is switched to the complementary duty ratio. The above configuration will be described in detail later.

When the antenna 2 starts to be driven (S102), it is determined whether the value of the current flowing through the antenna 2 falls within a predetermined range (S104). As a result, when the current value of the antenna 2 falls within the predetermined range (yes in S104), it is considered that the intensity of the radio wave transmitted by the antenna 2 is also set to an appropriate intensity, and therefore it is determined whether the transmission has been completed (S105). In other words, when the transmission data is transmitted from the control device 10, it may be determined that the transmission has not been completed. When the transmission data has not been transmitted, it may be determined that the transmission has been completed.

When the transmission has not been completed (no in S105), it is determined whether the accumulated driving time of the antenna 2 has reached a predetermined switching time (S106). The switching time may be set to, for example, 30 seconds.

Since the driving time of the antenna 2 does not reach the switching time for a while after starting the transmission, a determination of "no" is made in S106, and it is determined whether the current value of the antenna 2 falls within a predetermined range (S104). As a result, when the current value has not fallen within the predetermined range (no in S104), the duty ratio correction process (S200) is started, so that the duty ratio is corrected so that the current value falls within the predetermined range, and then it is determined whether or not the transmission is terminated (S105). The duty ratio correction process will be described later in detail.

When the current value of the antenna 2 falls within the predetermined range (yes in S104), without performing the duty ratio correction process (S200), it is determined whether the transmission is terminated (S105). As a result, when the transmission is terminated (yes in S105), the antenna driving process of FIG. 8 is terminated after the accumulation of the driving times has been stopped (S107). When it is determined that signal is to be transmitted next time (yes in S100), the driving time is accumulated with respect to the driving time at that time in S103.

While the above operation is being repeated, the accumulated driving time of the antenna 2 eventually reaches the switching time. Then, since a determination of "yes" is made in S106, the duty ratio used for driving the antenna 2 is switched to the complementary duty ratio (S108). As described above with reference to (e) of FIG. 7 and (f) of FIG. 7, the complementary duty ratio is a duty ratio having a complementary relationship. For example, if the current duty ratio is 32%, the complementary duty ratio is switched to 68%.

Then, the switched duty ratio is stored in a memory device of the antenna driving apparatus 100 (S109). The memory device is a memory that reads the duty ratio in S101 when it is determined that the signal is to be transmitted (yes in S100). For example, when the duty ratio is switched from 32% to 68% in S109, 68% is used as the duty ratio used for driving the antenna 2 when the antenna driving process is started next time.

When the duty ratio used for driving the antenna 2 is switched to the complementary duty ratio (S109), the accumulated driving time is initialized once (S110). After returning to S103 and resuming the accumulation of the driving times, it is determined whether the current value of the antenna 2 falls within a predetermined range (S104). When the current value has not fallen within the predetermined range (no in S104), the duty ratio correction process to be described later is started (S200). When the current value has fallen within the predetermined range (yes in S104), it is determined whether the transmission is terminated without starting the duty ratio correction process (S105). If the transmission has not been terminated (no in S105), it is determined whether the driving time of the antenna 2 has reached the switching time (S106). If the driving time has not reached the switching time (no in S106), the process again returns to S104, a series of operations described above is repeated.

When the driving time of the antenna 2 has reached the switching time (yes in S106) while repeating the above operation, the duty ratio used for driving the antenna 2 is switched again to the complementary duty ratio (S108). For example, when the antenna 2 is driven at the duty ratio of 32% and the driving time has reached the switching time, the duty ratio is switched to 68%, which is the complementary duty ratio of 32%. When the driving time has reached the switching time again, the duty ratio is switched to 32%, which is the complementary duty ratio of 68%.

Each time the driving time of the antenna 2 reaches the switching time, the antenna driving apparatus 100 according to the present embodiment drives the antenna 2 while switching the duty ratio used for driving the antenna 2 to the complementary duty ratio. When the current value of the antenna 2 falls outside the predetermined range during driving (yes in S104), the duty ratio correction process to be described below is started for correcting an appropriate duty ratio.

Figure 9:
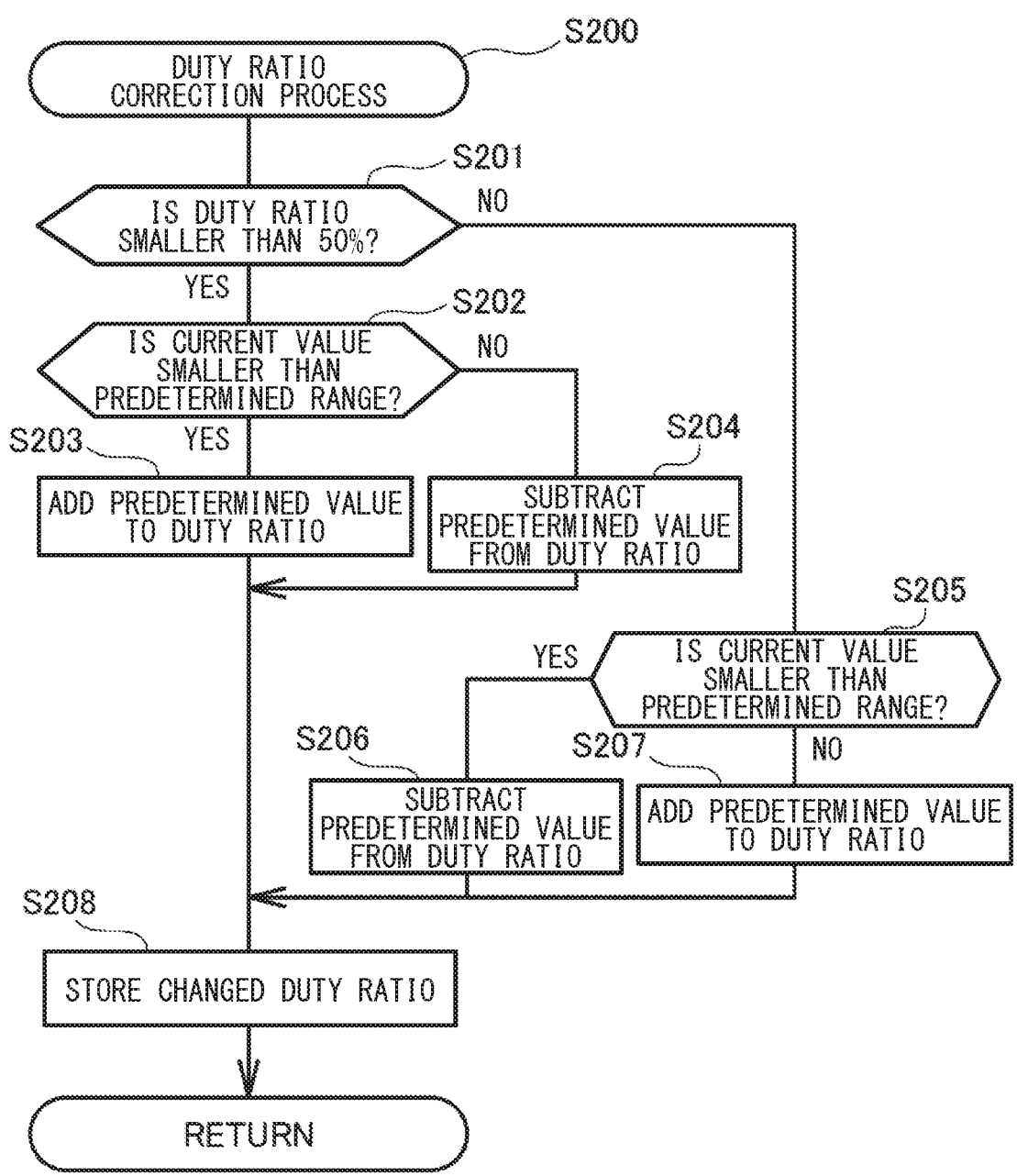
FIG. 9 is a flowchart of a duty ratio correction process performed to adjust a value of the current flowing through the antenna in the antenna driving process.

C. Duty Ratio Correction Process:

FIG. 9 is a flowchart of a duty ratio correction process for correcting the duty ratio when the antenna 2 is driven so as to reach an appropriate duty ratio. As described above, the above process is started when it is determined that the current value of the antenna 2 do not fall within the predetermined range in the antenna driving process. In the antenna driving apparatus 100, since the duty ratio used for driving the antenna 2 is switched to the complementary duty ratio, there are situations where the duty ratio has a value smaller than 50% or a value larger than 50%. Therefore, it is determined whether the present duty ratio is smaller than 50% or not (S201).

Figure 10:
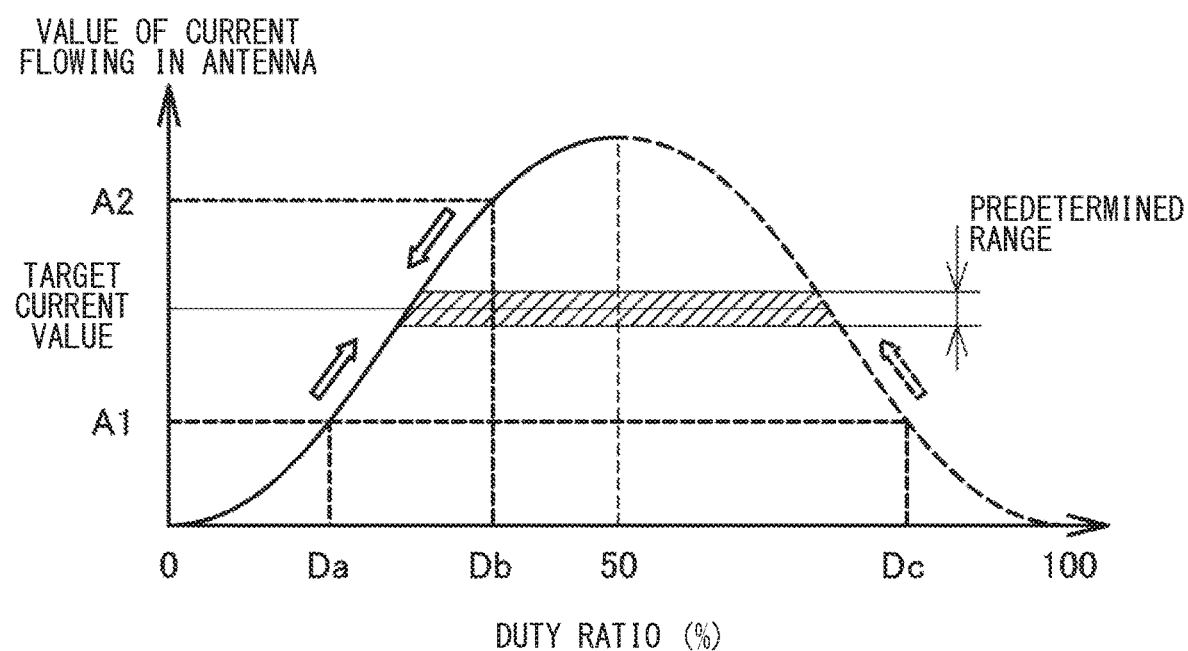
FIG. 10 is an illustrative diagram showing a state in which the value of the current flowing through the antenna is adjusted by correcting the duty ratio.

When it is determined that the duty ratio is smaller than 50% (yes in S201), it is determined whether or not the current value is smaller than a predetermined range (S202). When the current value is smaller than the predetermined range (yes in S202), a predetermined small value (for example, 1%) is added to the duty ratio (S203). When the current value is larger than the predetermined range (no in S202), a predetermined small value (for example, 1%) is subtracted from the duty ratio (S204). For example, as in the duty ratio Da shown in FIG. 10, when the current duty ratio is smaller than 50% and a value A1 of the current flowing through the antenna 2 is smaller than a predetermined range from a target current value, the current value A1 may be brought closer to the target current value by increasing the duty ratio. When the current duty ratio is smaller than 50% and a value A2 of the current flowing through the antenna 2 is larger than the predetermined range from the target current value, as in the situation of the duty ratio Db, the current value A1 may be brought closer to the target current value by decreasing the duty ratio.

When it is determined in S201 that the current duty ratio is larger than 50% (no in S201), it is determined whether or not the current value is smaller than the predetermined range (S205). When the current value is smaller than the predetermined range (yes in S205), a predetermined small value (for example, 1%) is subtracted from the duty ratio (S206). As in the duty ratio Dc shown in FIG. 10, when the current duty ratio is larger than 50% and the value A1 of the current value flowing through the antenna 2 is smaller than the predetermined range from the target current value, the current value A1 may be brought closer to the target current value by decreasing the duty ratio.

When it is determined in S205 that the current value is larger than the predetermined range (no in S205), a predetermined small value (for example, 1%) is added to the present duty ratio (S207).

When the duty ratio is changed (S203, S204, S206, and S207 in FIG. 9), after the changed duty ratio is stored in the memory of the antenna driving apparatus 100 (S208), the duty ratio correction process in FIG. 9 is once terminated, and the process returns to the antenna driving process in FIG. 8.

Since the duty ratio is changed gradually in the duty ratio correction process as described above, in the restored antenna driving process, the current value of the antenna 2 may still be determined to be outside the predetermined range (no in S104 in FIG. 8). However, in such a situation, the duty ratio correction process in FIG. 9 is restarted. As a result, the duty ratio may be corrected so that the current value of the antenna 2 eventually falls within a predetermined range.

In the antenna driving process described above with reference to FIG. 8, the antenna 2 is driven while alternately switching between the corrected duty ratio and the complementary duty ratio. Since the time during which the current flows in the switch elements SW1H, SW1L, SW2H, and SW2L of the full bridge circuit 100*a* may be equalized, the lifetime of the antenna driving apparatus 100 may be extended.

D. Modification

There are several modifications of the antenna driving apparatus 100 according to the present embodiment described above. The following describes those modifications focusing on configurations different from the present embodiment.

D-1. First Modification:

In the antenna driving process of the present embodiment described above with reference to FIG. 8, the duty ratio used for driving the antenna 2 is switched to the complementary duty ratio every time the driving time of the antenna 2 reaches a predetermined switching time. Instead of the driving time of the antenna 2, the duty ratio may be switched to the complementary duty ratio every time the number of transmissions of transmission data reaches a predetermined number of times. Alternatively, the duty ratio may be switched to the complementary duty ratio every time the amount of transmitted data reaches a predetermined amount.

Figure 11:
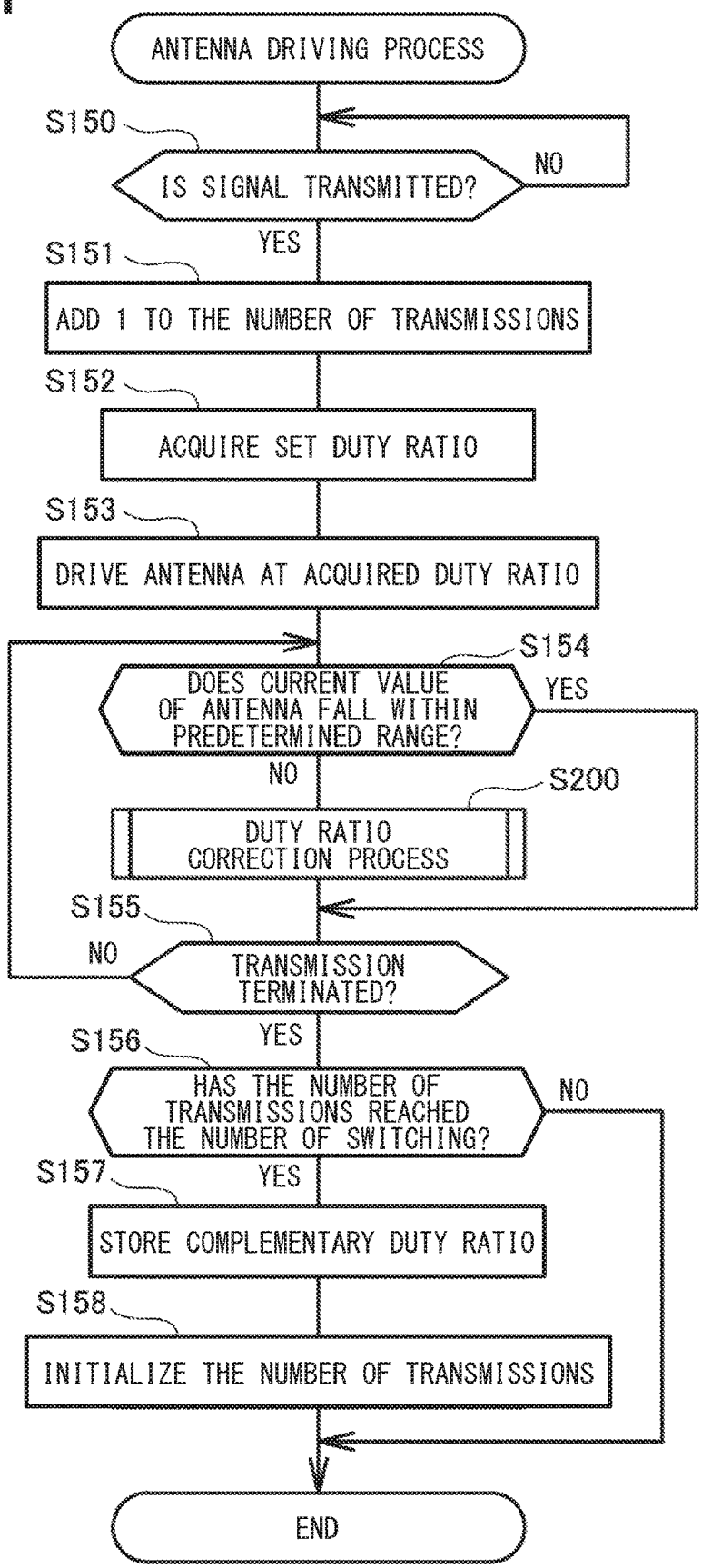
FIG. 11 is a flowchart of an antenna driving process according to a first modification.

FIG. 11 shows a flowchart of an antenna driving process according to a first modification in which the duty ratio is switched to the complementary duty ratio every time the number of transmissions of transmission data reaches a predetermined number of times.

As shown in FIG. 11, also in the antenna driving process according to the first modification, when the process is started, it is first determined whether or not a signal is transmitted from the antenna 2 (S150). When the transmission data is not transmitted from the control device 10, it is determined that the signal is not transmitted (no in S150), and the control device 10 is in a waiting state.

When the transmission data is transmitted from the control device 10, it is determined that the signal is to be transmitted (yes in S150). In the first modification, "1" is added to the number of transmissions (S151).

After the duty ratio preliminarily set in the memory of the antenna driving apparatus 100 is acquired (S152), the antenna 2 is driven by use of the acquired duty ratio (S153). Then, it is determined whether a value of the current flowing through the antenna 2 falls within a predetermined range (S154). When the current value of the antenna 2 falls within the predetermined range (yes S154), it is determined whether the transmission has been terminated (S155).

When the transmission has not been terminated (no in S155), it is determined whether the current value of the antenna 2 falls within the predetermined range (S154). When the current value of the antenna 2 falls within the predetermined range (S154: yes), it is determined whether the transmission has been terminated (S155). When the current value of the antenna 2 falls outside the predetermined range (no in S154), the duty ratio correction process (S200) described above with reference to FIG. 9 is executed to correct the duty ratio, and then it is determined whether the transmission has been terminated (S155).

If it is determined that the transmission has been terminated while repeating the above operation (yes in S155), it is determined whether the number of transmissions has reached a predetermined number of switching times (S156). The number of switching times may be set to, for example, five.

When the number of transmissions has not reached the number of switching times (no in S156), the antenna driving process according to the first modification is terminated. When a next signal is transmitted (yes in S150), after "1" has been added to the number of transmissions (S151), the series of operations described above is executed, and when it is determined that the transmission has been terminated (yes in S155), it is determined whether the number of transmissions has reached a predetermined number of switching times (S156).

While repeating the above process, the number of transmissions eventually reaches a predetermined number of switching times, and a determination of "yes" is made in S156. In this situation, the complementary duty ratio of the duty ratio used until now is stored in the memory of the antenna driving apparatus 100 (S157), and the number of transmissions is initialized (S158), in preparation for the situation of transmitting the transmission data. Subsequently, the antenna driving process of the first modification of FIG. 11 is terminated.

Even when the antenna driving process according to the first modification is used, the antenna 2 is driven while alternately switching the duty ratio and the complementary duty ratio. The lifetime of the antenna driving apparatus 100 may be extended by equalizing the times during which the current flows in the switch elements SW1H, SW1L, SW2H, and SW2L of the full bridge circuit 100*a*.

Since the duty ratio is switched after the transmission of the transmission data has been finished, it is possible to avoid a possibility that noise is mixed into the signal due to the duty ratio being switched during the transmission of the signal.

D-2. Second Modification:

In the present embodiment and the first modification described above, the drive voltage applied to the antenna 2 has a rectangular waveform in which the positive and negative polarities are alternately switched. Although the drive voltage applied to the antenna 2 is a rectangular waveform, the polarity of the drive voltage may not be changed.

Figure 12:
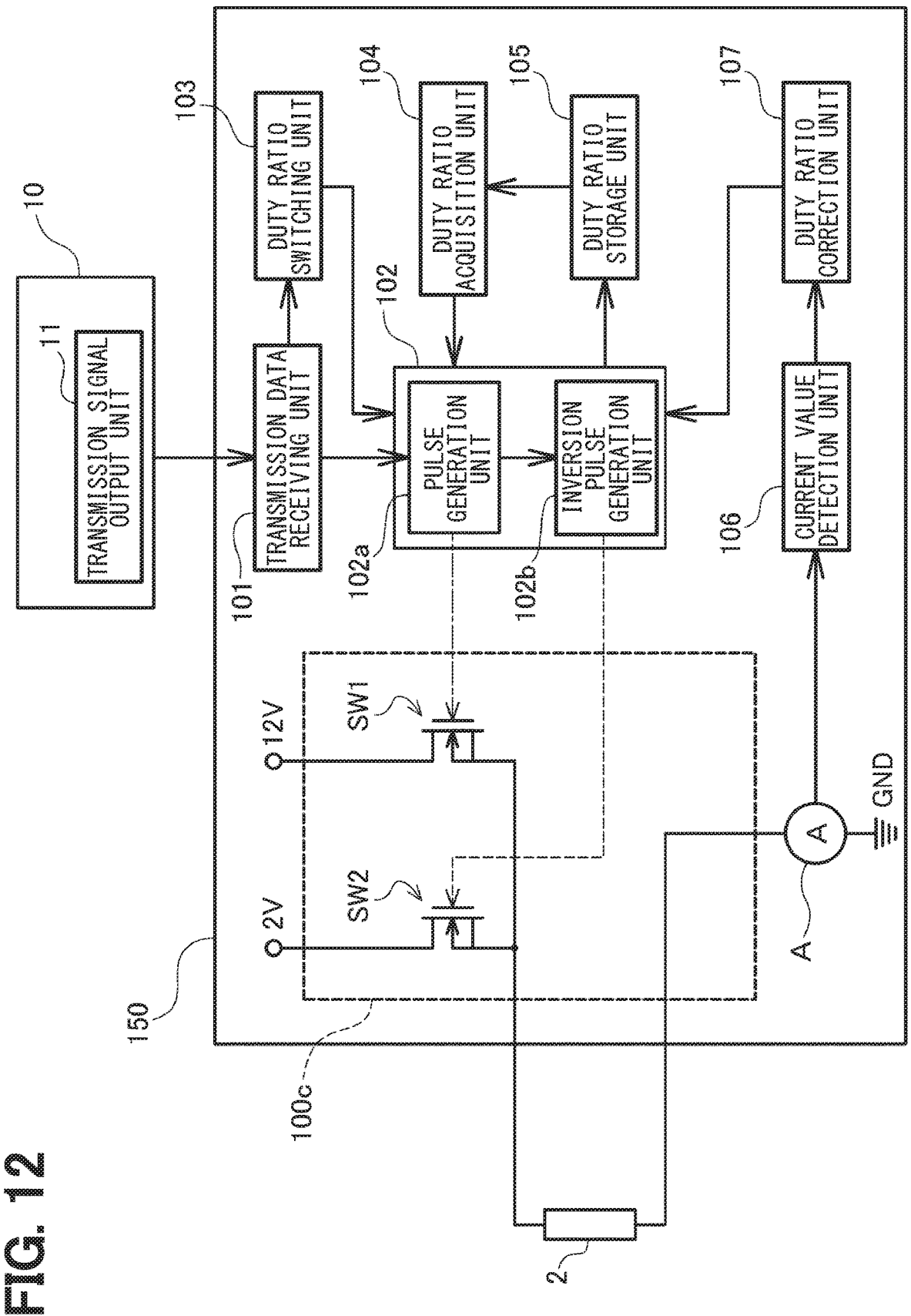
FIG. 12 is a block diagram showing an internal structure of an antenna driving apparatus according to a second modification.

FIG. 12 illustrates an internal configuration of an antenna driving apparatus 150 according to a second modification. The antenna driving apparatus 150 according to the second modification shown in FIG. 12 differs from the antenna driving apparatus 100 of the present embodiment described above with reference to FIG. 2 in that the full bridge circuit 100*a* is changed to a half bridge circuit 100*c*, but is otherwise the same.

In the antenna driving apparatus 150 according to the second modification, the same parts as those of the antenna driving apparatus 100 of the present embodiment described above are denoted by the same reference numerals as those of the antenna driving apparatus 100 in the present embodiment. A description of the same parts are omitted.

As shown in FIG. 12, the half bridge circuit 100*c* included in the antenna driving apparatus 150 according to the second modification includes two switch elements SW1 and SW2. Those switch elements SW1 and SW2 are also formed of so-called power transistors, similarly to the switch elements SW1H, SW1L, SW2H, and SW2L of the present embodiment described above.

The switch element SW1 in the two switch devices SW1 and SW2 is provided between a DC power supply of 12 V (for example, battery) and an antenna 2. The switch element SW2 is disposed between an antenna 2 and a DC power supply of a voltage value (2 V in this example) lower than a voltage (12 V in this example) of a DC power supply connected with the switch element SW1.

The other end side of the antenna 2 (that is, a side of the antenna 2 not connected with the switch element SW1 and the switch element SW2) is grounded to the ground GND through an ammeter A.

Pulse data generated by a pulse generation unit 102a is output to the switch element SW1. The pulse data is data in which a Hi state and a Low state are alternately repeated. Inversion pulse data generated by an inversion pulse generation unit 102b is output to the switch element SW2. The inversion pulse data is data which is in the Low state when the pulse data is in the Hi state, and is in the Hi state when the pulse data is in the Low state, and alternately repeats the Hi state and the Low state.

Figure 13:
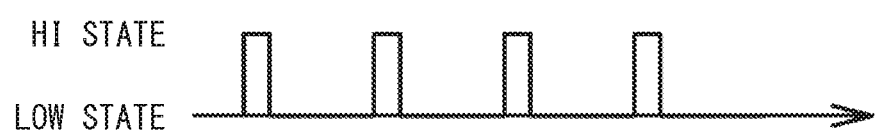
FIG. 13 is an illustrative diagram of the operation of a half bridge circuit of the antenna driving apparatus according to the second modification.
Figure 13:
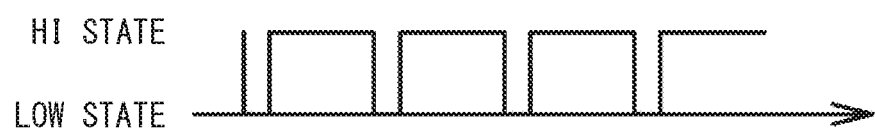
Figure 13:
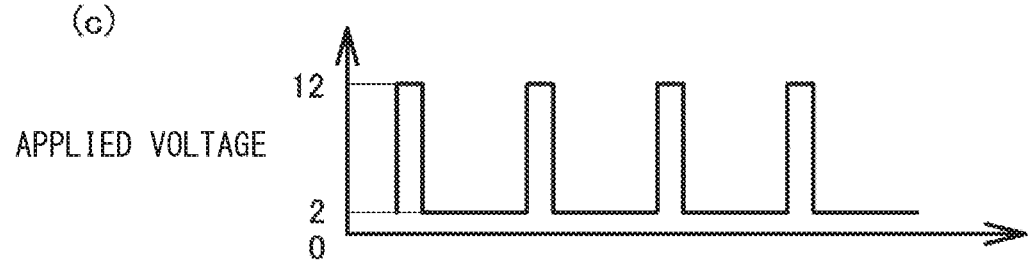

The following describes an operation of the antenna driving apparatus 150 according to the second modification. First, it is assumed that pulse data as illustrated in (a) of FIG. 13 is output from the pulse generation unit 102a to the switch element SW1. The inversion pulse generation unit 102b outputs inversion pulse data as shown in (b) of FIG. 13 to the switch element SW2.

Each of the switching elements SW1 and SW2 is rendered conductive when the Hi state is output, and is rendered nonconductive when the low state is output. When the pulse data in (a) of FIG. 13 is in the Hi state, a voltage of 12 V is applied to the antenna 2. When the pulse data is in the Low state, a voltage of 2 V is applied to the antenna 2. As a result, a voltage having a rectangular waveform as shown in (c) of FIG. 13 is applied to the antenna 2.

While the applied voltage is 12 V, a current flows in the switch element SW1, and no current flows in the switch element SW2. While the applied voltage is 2 V, a current flows through the switch element SW2, but no current flows through the switch element SW1. In an example shown in FIG. 13, a current flows in a biased manner in the switch element SW2.

Even in the above situations, if the duty ratio used for generating the pulse data is alternately switched to the complementary duty ratio, a current may be allowed to flow so as not to be biased to either the switch element SW1 or the switch element SW2.

Figure 14:
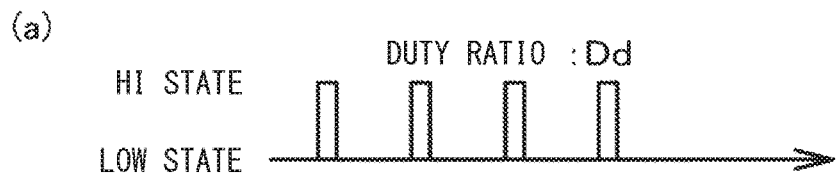
FIG. 14 is an illustrative diagram of the reason why the times during which the current flows through the multiple switch elements may be equalized by switching the duty ratio to a duty ratio having a complementary relationship to each other even in the situation of the second modification.
Figure 14:
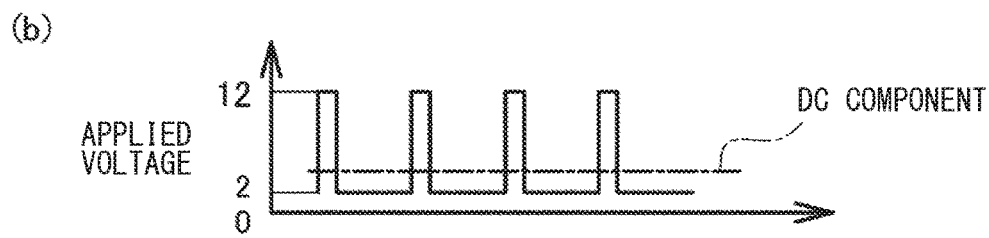
Figure 14:
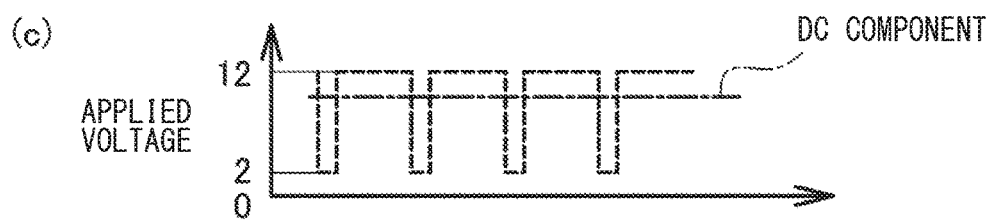
Figure 14:
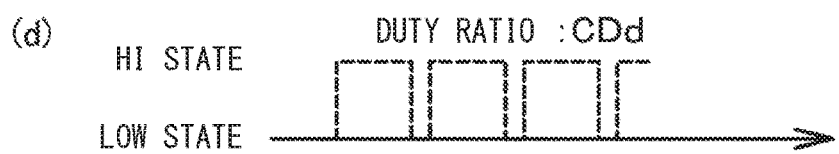
Figure 14:
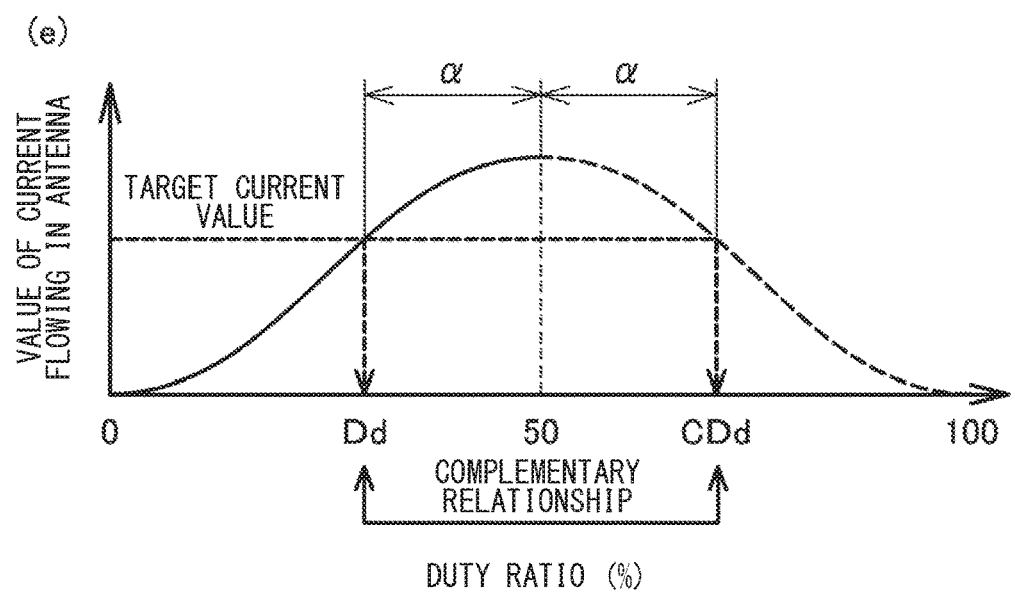

For example, it is assumed that the pulse data is data as illustrated in (a) of FIG. 14. As shown in (b) of FIG. 14, the voltage waveform applied to the antennas 2 based on the above pulse data is a waveform in which a high voltage value (in this example, 12 V) and a low voltage value (in this example, 2 V) are alternately repeated. As described above, in the above voltage waveforms, a current flows in a biased manner in the switch element SW2.

In a voltage waveform of (b) of FIG. 14, a voltage waveform of (c) of FIG. 14 is considered such that the voltage becomes 2 V when the voltage value is 12 V and becomes 12 V when the voltage value is 2 V. Those two voltage waveforms have different DC components (that is, average value) indicated by a one-dot chain line in the figure, but the frequency components are the same. Even when any voltage waveform is applied, the same resonance occurs in the antenna 2, so that the value of the current flowing through the antenna 2 is also the same.

In a voltage waveform of (c) of FIG. 14, since a time when the voltage of 12 V is applied to the antenna 2 is longer than a time when the voltage of the 2 V is applied to the antenna 2, the current flows through the switch element SW1 in a biased manner (opposite to the voltage waveform in (b) of FIG. 14)

The pulse data for generating the voltage waveform shown in (c) of FIG. 14 is pulse data shown in (d) of FIG. 14. The pulse data shown in (a) of FIG. 14 and the pulse data shown in (d) of FIG. 14 are complementary to each other. When the duty ratio of the pulse data in (a) of FIG. 14 is Dd and the duty ratio of the pulse data in (d) of FIG. 14 is CDd, a relationship of $Dd=50-\alpha$ and $CDd=50+\alpha$ is established as shown in (e) of FIG. 14. As shown in (f) of FIG. 14, a relationship of $Dd+CDd=100$ is established. If the duty ratio of the pulse data for driving the antenna 2 is switched to the complementary duty ratio, a state in which the current flows biased to the switch element SW1 and a state in which the current flows biased to the switch element SW2 may be switched to each other without changing the value of the current flowing through the antenna 2.

Also in the antenna driving apparatus 150 of the second modification illustrated in FIG. 12, the duty ratio used for driving the antenna 2 is alternately switched to the duty ratio having the complementary relationship with each other. Therefore, it is possible to equalize the times during which the current flows in the switch elements SW1 and SW2. As a result, the lifetime of the antenna driving apparatus 150 may be extended.

It is noted that a flowchart or the processing of the flowchart in the present application includes sections (also referred to as steps), each of which is represented, for instance, as S100. Further, each section may be divided into several sub-sections while several sections may be combined into a single section. Furthermore, each of thus configured sections may be also referred to as a device, module, or means.

Although the present disclosure has been described in accordance with the examples, it is understood that the present disclosure is not limited to such examples or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. An antenna driving apparatus driving an antenna to transmit a radio wave by applying to the antenna a drive voltage with a rectangular waveform having a high voltage value and a low voltage value switched between each other in a predetermined cycle, the antenna driving apparatus comprising:

a high-voltage side switch configured to set the drive voltage to the high voltage value in response to the high-voltage side switch turning into a conductive state;

a low-voltage side switch configured to turn into a nonconductive state in response to the high-voltage side switch turning into the conductive state, the low-voltage side switch further configured to set the drive voltage to the low voltage value on a condition that the low-voltage side switch turns into the conductive state in response to the high-voltage side switch turning into the nonconductive state;

a duty ratio acquisition unit configured to acquire a set value of a duty ratio as a time ratio at which the drive voltage is at the high voltage value in the rectangular waveform;

a drive voltage application unit configured to apply to the antenna the drive voltage having the rectangular waveform by repeating execution of turning the high-voltage side switch into the conductive state and then turning the high-voltage side switch into the nonconductive state at a timing corresponding to the duty ratio in the predetermined cycle, the duty ratio adopted by the drive voltage application unit to apply the drive voltage; and a duty ratio switching unit configured to execute switching of the duty ratio between a first duty ratio and a second duty ratio alternately in response to satisfying a predetermined switching condition, the second duty ratio having a complementary relationship with the first duty ratio.

2. The antenna driving apparatus according to claim 1, wherein the drive voltage application unit is further configured to apply the drive voltage by repeating execution of turning the high-voltage side switch into the conductive state and then turning the high-voltage side switch into the nonconductive state in a cycle corresponding to a resonance frequency of the antenna.

3. The antenna driving apparatus according to claim 1, further comprising:
a transmission data receiving unit configured to receive transmission data to be transmitted from the antenna,
wherein the drive voltage application unit is further configured to apply the drive voltage to the antenna by switching the high-voltage side switch according to the transmission data,
wherein the drive voltage application unit is further configured to stop the switching of the high-voltage side switch in a situation that the transmission data receiving unit does not receive the transmission data, and
wherein, in a situation of the transmission data receiving unit receiving the transmission data, the duty ratio switching unit is further configured to execute the switching of the duty ratio at a timing during which the drive voltage application unit stops the switching of the high-voltage side switch on condition that an accumulated driving time of the antenna reaches a predetermined time as the predetermined switching condition.

4. The antenna driving apparatus according to claim 1, further comprising:
a transmission data receiving unit configured to receive transmission data to be transmitted from the antenna,
wherein the drive voltage application unit is configured to apply the drive voltage to the antenna by switching the high-voltage side switch according to the transmission data,
wherein the drive voltage application unit is further configured to stop the switching of the high-voltage side switch in a situation that the transmission data receiving unit does not receive the transmission data,
wherein the predetermined switching condition is a condition that the transmissions of the transmission data reaches a predetermined number, and
wherein the duty ratio switching unit is configured to execute the switching of the duty ratio, in response to satisfying the predetermined switching condition.

5. The antenna driving apparatus according to claim 1, further comprising:
a full bridge circuit including the high-voltage side switch and the low-voltage side switch;
a current value detection unit configured to detect a value of a current flowing through the full bridge circuit; and
a duty ratio correction unit configured to correct the duty ratio to cause the value of the current flowing through the full bridge circuit to reach a predetermined target current value.

6. An antenna driving method for driving an antenna transmitting a radio wave by applying to the antenna a drive voltage having a rectangular waveform switching between a high voltage value and a low voltage value at a predetermined cycle, the antenna driving method comprising:
acquiring a setting of a duty ratio which is a time ratio of the high voltage value in the rectangular waveform, the duty ratio being a first duty ratio;
generating the drive voltage having the rectangular waveform corresponding to the duty ratio, and applying the drive voltage to the antenna; and
switching the duty ratio from a first duty ratio to a second duty ratio in response to satisfying a predetermined switching condition, the second duty ratio having a complementary relation with the first duty ratio.

7. The antenna driving apparatus according to claim 1, wherein the duty ratio is a time ratio of a period of the high voltage value to a total period of the rectangular waveform having the high voltage value and the low voltage value switched between each other.

8. The antenna driving apparatus according to claim 1, wherein a sum of the first duty ratio and the second duty ratio is 100 percent.

9. An antenna driving apparatus driving an antenna to transmit a radio wave by applying to the antenna a drive voltage with a rectangular waveform having a high voltage value and a low voltage value switched between each other in a predetermined cycle, the antenna driving apparatus comprising:
a high-voltage side switch configured to set the drive voltage to the high voltage value in response to the high-voltage side switch turning into a conductive state;
a low-voltage side switch configured to turn into a nonconductive state in response to the high-voltage side switch turning into the conductive state, the low-voltage side switch further configured to set the drive voltage to the low voltage value on a condition that the low-voltage side switch turns into the conductive state in response to the high-voltage side switch turning into the nonconductive state; and
a processor configured to:
acquire a set value of a duty ratio as a time ratio at which the drive voltage is at the high voltage value in the rectangular waveform;
apply to the antenna the drive voltage having the rectangular waveform by repeating execution of turning the high-voltage side switch into the conductive state and then turning the high-voltage side switch into the nonconductive state at a timing corresponding to the duty ratio in the predetermined cycle; and
execute switching of the duty ratio between a first duty ratio and a second duty ratio alternately in response to satisfying a predetermined switching condition, the second duty ratio having a complementary relationship with the first duty ratio.

\* \* \* \* \*